(12) United States Patent
Yoshida et al.

(10) Patent No.: US 7,685,612 B2
(45) Date of Patent: Mar. 23, 2010

(54) DISK APPARATUS

(75) Inventors: Norikatsu Yoshida, Hyogo (JP); Masanori Ohnishi, Osaka (JP)

(73) Assignee: Panasonic Corporation, Osaka (JP)

( * ) Notice: Subject to any disclaimer, the term of this patent is extended or adjusted under 35 U.S.C. 154(b) by 582 days.

(21) Appl. No.: 11/727,786

(22) Filed: Mar. 28, 2007

(65) Prior Publication Data

US 2007/0240175 A1    Oct. 11, 2007

(30) Foreign Application Priority Data

Apr. 7, 2006   (JP)   ............................. 2006-106188

(51) Int. Cl.
    *G11B 17/04*   (2006.01)
(52) U.S. Cl. .................................... 720/625
(58) Field of Classification Search ................. 720/624, 720/625
    See application file for complete search history.

(56) References Cited

U.S. PATENT DOCUMENTS 7,437,745 B2 * 10/2008 Seol ........................... 720/624
7,472,403 B2 * 12/2008 Tatekawa et al. ............ 720/624
7,559,068 B2 *  7/2009 Kido .......................... 720/624

FOREIGN PATENT DOCUMENTS

| JP | 2002-140850 | 5/2002 |
| JP | 2003-59151 | 2/2003 |
| JP | 2005-50440 | 2/2005 |

* cited by examiner

*Primary Examiner*—Angel A. Castro
(74) *Attorney, Agent, or Firm*—Wenderoth, Lind & Ponack, L.L.P.

(57) ABSTRACT

To provide a disk apparatus including a disk guide for guiding movement of a disk in a disk insertion direction; wherein the disk guide includes a platy guide member, a convex portion provided in vicinity of opposite ends of a platy guide member, and an engagement portion disposed on the same surface as the convex portion of the guide member. By engaging and fixing the engagement portion to a platy disk guide fixing member, which is disposed in a chassis of the disk apparatus, and bringing into contact with the convex portion on this platy disk guide fixing member, the disk guide is inclined in a direction far from the disk fixing member with an inclined angle increased from the center part of the guide member toward respective ends and the disk guide brings into contact with only an outer circumferential portion of the disk in inserting.

5 Claims, 14 Drawing Sheets

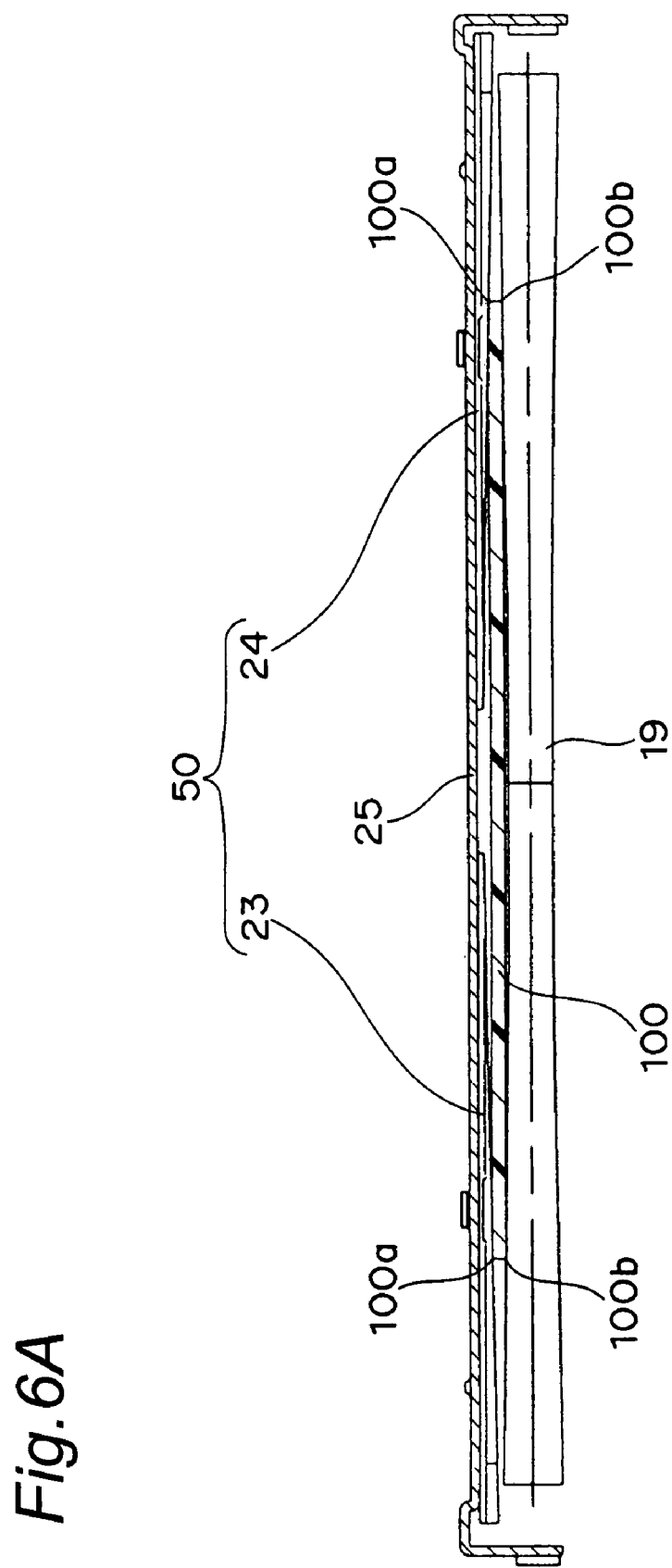

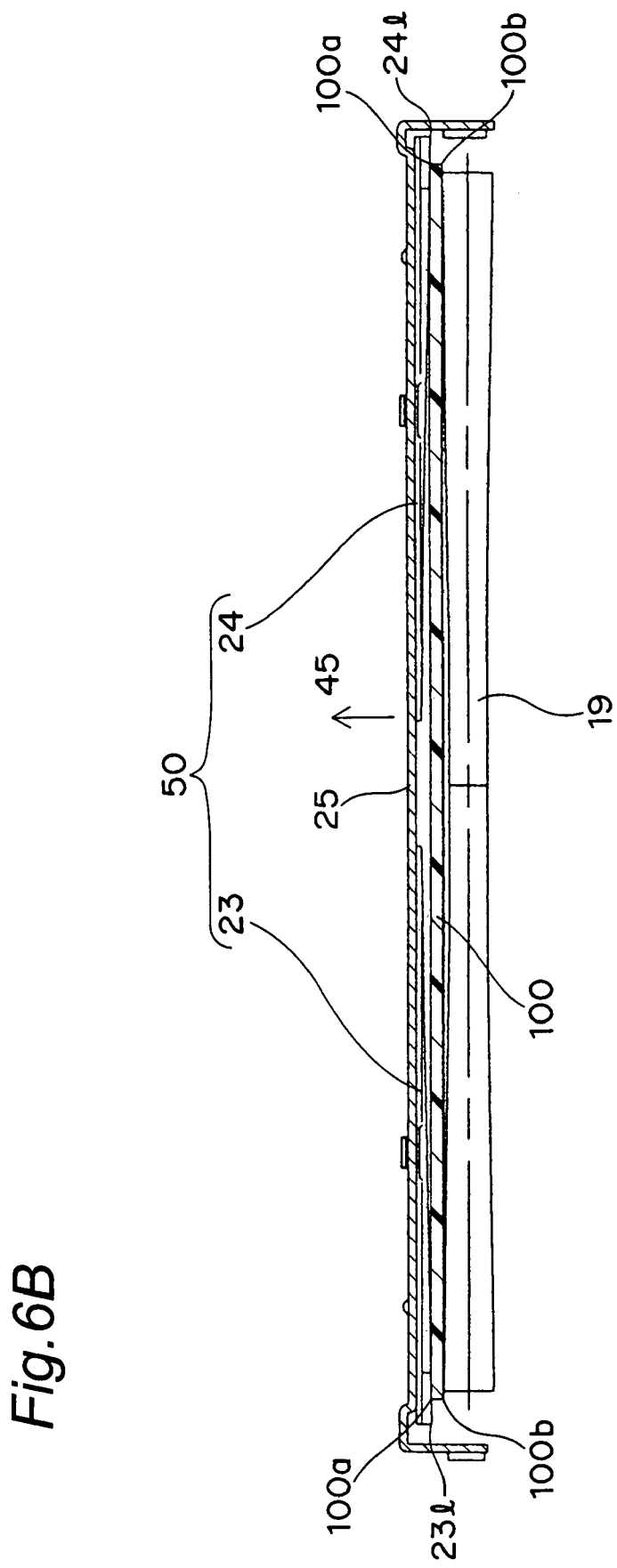

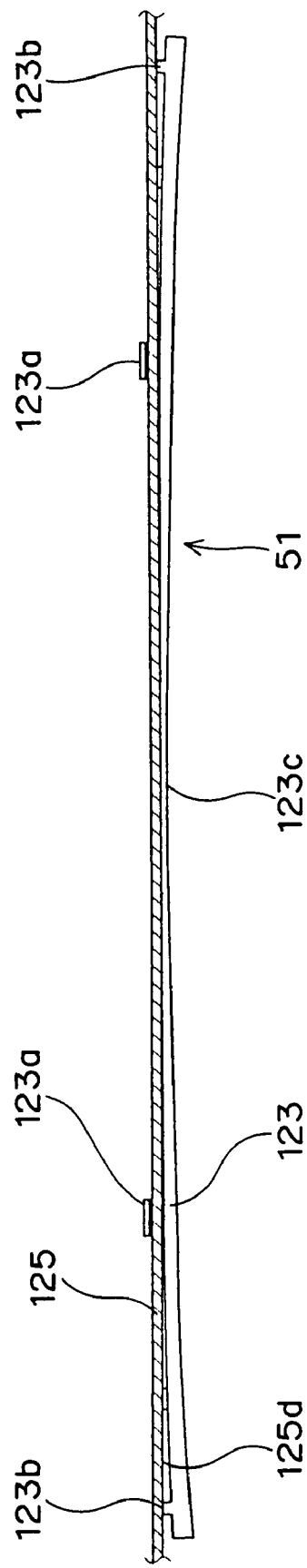

DISK APPARATUS

BACKGROUND OF THE INVENTION

The present invention relates to a disk apparatus for recording and reproducing a information by conveying a recording medium shaped in a disk such as a CD (Compact Disc) and a DVD (Digital Versatile Disc) (hereinafter, referred to as a disk) in the apparatus and mounting the disk on a disk recording reproduction position.

As a mechanism for loading the disk in the disk apparatus without using a tray, a slot-in loading mechanism has been known. This mechanism is one for elastically sandwiching a part of the disk to be inserted in the disk apparatus by means of a longitudinal rubber roller and a guide member which is disposed on a position opposed to the rubber roller for bring in the disk in the interior part of the apparatus by rotating the rubber roller thereon, and setting the disk in the disk recording reproduction position. As a conventional example of such a slot-in loading mechanism, for example, the invention disclosed in Patent Document 1 (Japanese Unexamined Patent Publication No. 2002-140850) and the invention disclosed in Patent Document 2 (Japanese Unexamined Patent Publication No. 2003-059151) may be considered.

In the apparatus of Patent Document 1, a disk guide disposed in the vicinity of an insertion port of the disk for guiding movement (insertion and discharge) in a conveying direction of the disk in cooperation with the rubber roller is formed by a synthetic resin (for example, plastic) which is softer than the disk, and as shown in FIGS. 16 and 17 of Patent Document 1, this disk guide is held by a metal plate so as to keep a rigidity. As an example of a synthetic resin forming this disk guide, a polyacetal resin composition having a structure whereby the disk is hardly scratched as disclosed in Patent Document 3 (Japanese Unexamined Patent Publication No. 2005-050440) may be considered.

On the other hand, the disk guide used for the apparatus of Patent Document 2 is made of not a resin but, as shown in FIG. 3 of Patent Document 2, a metal plate formed having a plurality of projection guide portions (projections linearly continued) projecting in a mountain shape so as to approach the rubber roller as the disk guide reaches the outside. Thereby, the disk guide can be made slim and the number of parts thereof can be reduced.

SUMMARY OF THE INVENTION

In the apparatus disclosed in Patent Document 2, the disk guide is made of a metal plate, so that it is feared that the surface which is the other side of a recording surface, namely, a label surface of the disk with which the disk guide brings into contact is scratched. There is a pit recorded on the label surface side, particularly, on the disk having a thin label printing such as a CD, so that if a scratch is made deep, an error rate is increased and this causes an adverse affect on reproduction.

As means for preventing the scratch of the disk, for example, means for applying painting or coating or the like to the disk may be considered. However, if the disk is applied with painting or coating or the like, a coefficient of friction of the disk is increased and a defect such that a disk conveyance force of the rubber roller is hardly transmitted is generated. In order to enhance the disk conveyance force of the rubber roller, if a suppress strength for suppressing the disk on the disk guide by the rubber roller is enhanced, the disk is further rubbed on the disk guide, so that the disk is easily scratched. As a result, the means cannot prevent the disk from being easily scratched.

In addition, it is feared that the disk is scratched by the false operation of a user, for example, adversely inserting the recording surface of the disk and the label surface thereof or the like. Further, in recent years, the amount of the disk having the recording surfaces on the both sides has been increased. Therefore, as a material of the disk guide, as shown in Patent Documents 1 and 3, a synthetic resin such as polyacetal resin composition having a structure whereby the disk is hardly scratched may be appropriately used.

However, even when a material softer than the disk is used for the disk guide, if the disk guide is brought into contact with the disk, a dust floating in air, a dust attached to the disk due to a static electricity, or a substance harder than or having the same hardness as the disk such as a particle made of fallen burr formed on the outer circumference of the disk upon molding is sandwiched in a gap between the disk guide and the disk so as to likely scratch the disk. Therefore, it is necessary to secure a gap between the disk guide and the recording surface of the disk or a gap between the disk guide and the label surface (hereinafter, referred to as the inside of the disk) to some extent. If this gap is made too large, the size of the apparatus is increased, so that it is normally preferable that this gap is formed by allowing the disk guide to be inclined about 1 degree (90 μm for a distance of 5 mm) on the disk. Therefore, it may be considered to form the above-described inclined angle by providing the projection guide portion projecting in a mountain shape so as to approach the rubber roller as the disk guide reaches the outside as the apparatus disclosed in Patent Document 2. However, if the projection guide portion is provided in the disk guide made of a synthetic resin, the thickness of the part where the projection guide portion is disposed is increased, so that the disk guide is easily deformed (for example, a sink) upon molding of the disk guide, and on the other hand, the disk itself is deformed due to a suppress strength from the part where the projection guide portion is disposed and a warpage is easily generated in a direction approaching the disk guide. In addition, on the contrary, the thickness on the center side of the disk guide is made thin, so that the warpage is frequently generated so that floating is easily generated. Further, the disk guide has the same length as that of the disk of a standard diameter 12 cm (hereinafter, referred to as a large diametrical disk) and is a comparatively longer member, so that warpage or floating due to the warpage is easily generated. Therefore, it is difficult to secure the gap between the disk guide and the inside of the disk and it is difficult to prevent the scratch from caused in the inside of the disk.

In addition, in the case of fixing the disk guide to a fixing member being engaged therewith, a certain degree of gap is needed between an engagement portion of the disk guide and the fixing member. However, if the gap is provided between the engagement portion of the disk guide and the fixing member, due to this gap, the disk guide is to be fixed to the fixing member with rattle generated. Therefore, a noise may be generated due to the oscillation to be generated by the rotation of the disk during reproduction or recording.

Accordingly, the present invention has been made taking the foregoing issues into consideration and an object of which is to provide a disk apparatus for preventing the inside of a disk from being scratched by a disk guide to guide the disk into the apparatus in a slot-in loading mechanism for loading the disk in the disk apparatus without using a tray with the disk guide fixed without rattle.

In order to improve the above-described issues, the present invention may be constituted as follows.

According to a first aspect of the present invention, there is provided a disk apparatus comprising:

a chassis on which a disk insertion port for inserting a disk therein is formed on one side thereof;

a disk guide for guiding movement of the disk in a disk insertion direction, which is disposed in the chassis and bringing into contact with the disk to be inserted from the disk insertion port;

a disk conveying device for conveying the disk to a disk mounting preparation position being opposed to a disk recording reproduction position in the chassis in cooperation with the disk guide, which is disposed in the chassis;

a disk clamp device for mounting the disk conveyed to the disk mounting preparation position on the disk recording reproduction position, which is disposed in the chassis; and a recording reproducing device for reproducing or recording and reproducing the disk mounted on the disk recording reproduction position, which is disposed in the chassis;

wherein, the disk guide comprising:

a platy guide member having a disk contact surface for bringing into contact with the disk in inserting, for guiding movement of the disk in the disk insertion direction with the disk contact surface, which is elongated in a intersecting direction for the disk insertion direction;

convex portions, which are disposed in a vicinity of respective ends on an opposite side of the disk contact surface of the guide member and in an elongated direction of the guide member; and an engagement portion, which is disposed on the opposite side surface of the disk contact surface of the guide member and on a center part side in the elongated direction from the convex portion;

wherein, the disk guide is fixed to a platy disk guide fixing member which is disposed in the chassis to be elongated in the intersecting direction with the engagement portion engaged to the disk guide fixing member, and the disk guide being bringing into contact with the convex portions on the platy disk guide member, the disk guide is inclined with an inclined angle increased in a direction far from the disk guide fixing member from a center part in the elongated direction of the guide member toward respective ends; and the disk contact surface of the guide member brings into contact with only an outer circumferential portion of the disk in inserting.

According to a second aspect of the present invention, there is provided the disk apparatus as defined in the first aspect, wherein the guide member of the disk guide has a single platy member, and the engagement portion of the disk guide is disposed between the center part in the elongated direction of the guide member and the convex portion.

According to a third aspect of the present invention, there is provided the disk apparatus as defined in the first aspect, wherein the guide member of the disk guide has two platy members, which are disposed on opposite sides of the center part in the elongated direction of the guide member; and the disk guide comprises second engagement portions on respective ends on the center part side in the elongated direction of the guide member in addition to the engagement portion; and the disk guide is fixed on the disk guide fixing member by engaging the engagement portion and the second engagement portion to the disk guide fixing member.

According to a fourth aspect of the present invention, there is provided the disk apparatus as defined in the first aspect, wherein the disk guide fixing member comprises a convex part on a surface of an attaching side of the disk guide on the same position as the convex portion in place of the convex portion of the disk guide; and the engagement portion of the disk guide is engaged and fixed on the surface on the attaching side of the disk guide in the disk guide fixing member, and the guide member is inclined in the direction far from the disk guide fixing member as the guide member reaches from the center part in the elongated direction of the guide member toward each end by bringing into contact with the convex portion of the disk guide fixing member on the guide member of the disk guide, thereby the guide member brings into contact with only the outer circumferential portion of the disk in insertion.

According to a fifth aspect of the present invention, there is provided the disk apparatus as defined in the first aspect, wherein the disk clamp device comprises a clamper for suppressing the disk on the disk recording reproduction position in a turn table surface with the clamper bringing into contact with the disk which is conveyed to the disk mounting preparation position, a clamp unit for supporting the clamper, which includes the disk guide fixing member, the clamp unit being disposed to be elongated in the intersecting direction, and the clamp unit being rotatably fixed to the chassis centering around a side of the disk insertion port, and a driving mechanism for retreating the clamper to the disk mounting preparation position upon conveyance of the disk by means of the disk conveying device, enabling the disk contact surface of the guide member for bringing into contact with the disk to be inserted from the disk insertion port, rotating the clamp unit to move the clamper to the disk recording reproduction position, and retreating the disk from the disk contact surface of the guide member;

wherein the guide member of the disk guide has an inclined surface where the disk contact surface is inclined in a direction reaching the disk guide fixing member toward a downstream side in the disk insertion direction in a width direction in the vicinity of each end portion in the elongated direction; and the inclined surface is far from a surface of the disk and is inclined on the surface of the disk with the disk held on the turn table surface approximately in parallel therewith when the clamper is moved to the disk recording reproduction position and the disk is mounted on the disk recording reproduction position; and when the disk is floated to bring into contact with the disk contact surface of the guide member and is inclined for the turn table surface, the inclined surface brings into contact with the surface of the disk approximately in parallel therewith, or the portion on the downstream side in the disk insertion direction of the inclined surface brings into contact with only the surface of the disk.

According to the first aspect of the present invention, the disk guide is provided with a platy guide member, a convex portion which is disposed in the vicinity of each end in an elongated direction of the guide member, and an engagement portion disposed on the guide member. When the engagement portion is engaged to the platy disk guide fixing member and the convex portion brings into contact with the platy disk guide fixing member, a center portion in the elongated direction of the guide member is curved to a side of the guide fixing portion, and as it reaches each end from the center portion in the elongated direction of the guide member, the inclination is increased in a direction moving away from the disk fixing member, so that the disk guide can bring into contact with only an outer circumference of the disk. Therefore, no scratch is generated on the inside of the disk due to the disk guide. In addition, the disk guide is attached to the disk guide fixing portion being curved since the disk guide is engaged with the disk guide fixing portion at the engagement portion and bringing into contact with the disk guide fixing portion at the convex portion. Therefore, even if the guide member is curved upon molding of the guide member, the disk guide has a warpage which is stronger than that of the guide member. An elastic force is generated due to this strong warpage, so that the disk guide is reliably fixed to the disk guide fixing portion without rattle. In this case, floating of the disk guide is not generated. Accordingly, the rattle is reduced and this prevents generation of an abnormal noise due to the rotational oscillation of the disk during reproduction or recording.

In addition, even if as ink and a warpage is generated in the guide member and the inclination of the guide member is reduced, when the center portion in the elongated direction of the guide member is curved to the side of the guide fixing member by the convex portion, it is possible to secure the necessary inclined angle. As a result, no scratch is generated on the inside of the disk.

In addition, in the apparatus disclosed in Patent Documents 1, 2, and 3, when a shock or a quick operation due to movement or the like is caused during recording or reproduction, the disk may be separated from the disk recording reproduction position and be floated due to a gyroscopic precession of the rotating disk. In this case, an edge portion on one surface of the disk conflicts with the guide member, however, when the guide member is made of a metal as the apparatus disclosed in Patent Document 2, a loud unpleasant sound is generated. On the contrary, when the guide member is made of a resin which is softer than the disk as the apparatuses disclosed in Patent Documents 1 and 3, no unpleasant sound is generated. However, when the disk guide is trimmed by the edge portion of one surface of the disk and the disk is discharged, there is caused a defect such that the disk gets stuck with the trimmed portion and the disk cannot be discharged.

According to the fifth aspect of the present invention, in the vicinity of each end in the elongated direction of the guide member, there is provided an inclined surface which is inclined in a direction approaching the disk fixing member toward a downstream side in the disk insertion direction in the width direction. This inclined surface can bring into contact with the surface of the disk in parallel with and being opposed with this when the disk is clamped by the clamp unit with the upstream side in the disk insertion direction of the disk floating. Therefore, even if the disk floats from the disk recording reproduction position due to the gyroscopic precession in the disk apparatus recording or reproducing the disk and the guide member is brought into contact with the rotating disk, it is difficult to scratch a ridge line portion of the disk contact surface of the guide member by the edge portion of the disk. Accordingly, there is caused no defect such that the disk gets stuck with the disk contact surface of the guide member and the disk cannot be discharged. In addition, since the portion brought into contact (abutting) with the disk before other portions is retreated upon discharge of the disk, an effective effect such that conveyance of the disk is not prevented can be obtained. Further, since the portion brought into contact with the disk can be formed with a simple structure, it is possible to make the accuracy of molding of the disk guide for guiding the disk higher. Therefore, contact between the disk guide and the disk can prevent the inside of the disk from being scratched.

BRIEF DESCRIPTION OF THE DRAWINGS

These and other aspects and features of the present invention will become retreated from the following description taken in conjunction with the preferred embodiments thereof with reference to the accompanying drawings, in which:

FIG. 6A is a cross sectional view showing a state of a large diametrical disk which is sandwiched between the disk guide and the rubber roller upon start of loading of the disk apparatus according to the first embodiment of the present invention;

FIG. 6B is a cross sectional view showing the state of the large diametrical disk which is sandwiched between the disk guide and the rubber roller in the middle of loading of the disk apparatus according to the first embodiment of the present invention;

FIG. 10 is a front view showing a disk guide which is attached to a clamp lever of the disk apparatus of the second embodiment according to the present invention.

DETAILED DESCRIPTION OF THE PREFERRED EMBODIMENTS

Figure 1:
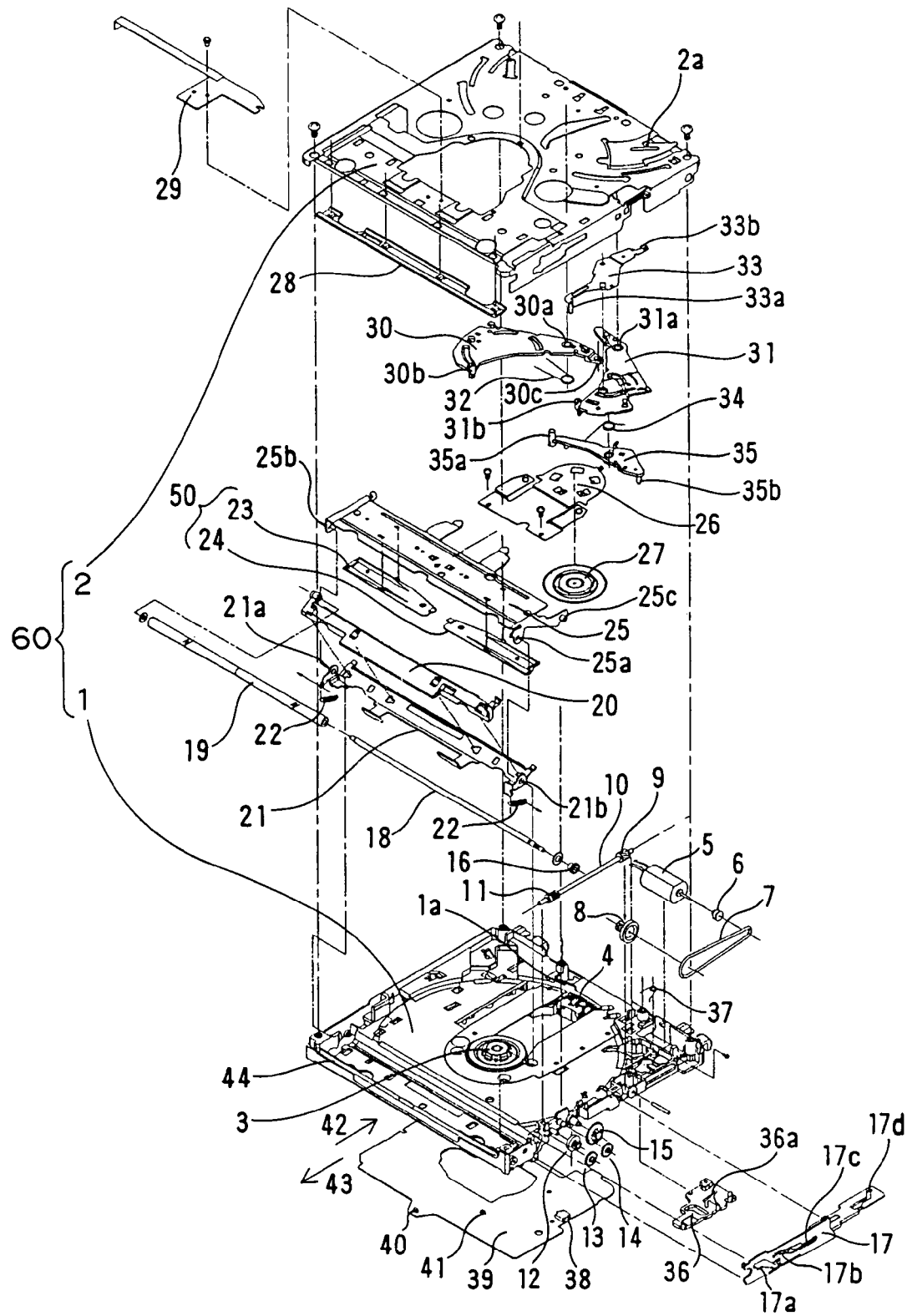
FIG. 1 is an exploded perspective view of a disk apparatus according to a first embodiment of the present invention.

Before the description of the present invention proceeds, it is to be noted that like parts are designated by like reference numerals throughout the accompanying drawings.

Hereinbelow, one embodiment of the present invention is described in detail with reference to the accompanying drawings.

First Embodiment

A disk apparatus according to a first embodiment of the present invention will be described with reference to the drawings. At first, a basic constitution of the disk apparatus according to the first embodiment of the present invention will be described with reference to FIG. 1. FIG. 1 is an exploded perspective view of the disk apparatus according to the first embodiment of the present invention.

The disk apparatus according to the first embodiment of the present invention is constituted by attaching respective parts and devices or the like within a chassis 60 having a support board 1 and a cover body 2 which is disposed so as to cover the upper part of the support board 1. In other words, the support board 1 supports respective parts and devices shown in FIG. 1. In one side face of the chassis 60 having the support board 1 and the cover body 2, a disk insertion port 44 for inserting and discharging a disk is formed.

On the support board 1, a turn table 3 for rotating a recording medium shaped in a disk such as a CD and a DVD (hereinafter, referred to as a disk) within the apparatus and an optical pickup 4 for recording and reproducing the data in the disk or the like are attached. The turn table 3 and the optical pickup 4 may form a part of a recording and reproducing device. In this case, the turn table 3 is formed by a rotor composing a spindle motor 3A to be described in detail later with reference to FIGS. 8A to 8C. On one end on a downstream side of a disk insertion direction 42 of the support board 1, a motor 5 to generate a rotational force upon loading of the disk in the disk apparatus is attached. In a rotational shaft of the motor 5, a first pulley 6 is inserted with pressure. On the side of one surface of the support board 1 as the first pulley 6 and on an upstream side in the disk insertion direction 42, a second pulley 8 integrally formed with a worm gear 11 is attached. A belt 7 is hung on the first pulley 6 and the second pulley 8 in order to transmit the rotational force of the rotational shaft of the motor 5 from the first pulley 6 to the second pulley 8. The second pulley 8 may rotate a helical gear 9 which is inserted with pressure in one end of a gear shaft 10 elongated in the disk insertion direction 42 due to the rotational force of the rotational shaft of the motor 5 which is transmitted via the first pulley 6 and the belt 7 for rotating a worm gear 11 which is inserted with pressure in other end of the gear shaft 10. In this case, the worm gear 11 is engaged with a helical gear 12 and the helical gear 12 is engaged with relay gears 13 and 14. In addition, the relay gear 13 is engaged with a roller gear 16 inserted with pressure in one end of a roller shaft 18, which is elongated in a direction in parallel with the support board 1 and bisecting the disk insertion direction 42. The relay gear 14 is engaged with a driving gear 15 for moving a cam rod 17 elongated in the disk insertion direction 42 in the disk insertion direction 42 or a disk discharge direction 43. As a result, the rotational force of the worm gear 11 is transmitted to the roller shaft 18 via the helical gear 12, the relay gear 13, and the roller gear 16. On the other hand, the rotational force is transmitted to the cam rod 17 via the helical gear 12, the relay gear 14, and the driving gear 15. Due to each gear, the rotational force of the rotational shaft of the motor 5 is decelerated and rotational torques of the driving gear 15 and the roller gear 16 are increased.

The roller shaft 18 is engaged with a hollow rubber roller 19 to transmit the rotational force of the roller gear 16 to the rubber roller 19 for conveying the disk by a frictional force. The rubber roller 19 is formed so that the diameter on the center side in the axial direction is made smaller and the diameter is made larger as it reaches the end. Opposite ends of the roller shaft 18 are rotatably held by a shaft holder 20, which is elongated in the direction in parallel with the support board 1 and bisecting the disk insertion direction 42. The shaft holder 20 is disposed on an upper surface of a roller lever 21 which is elongated in the direction in parallel with the support board 1 and bisecting the disk insertion direction 42. The roller lever 21 is rotatably held by the support board 1 by fitting each of a pair of rotational shafts (not illustrated) disposed on the support board 1 to bearing holes 21a and 21b disposed on opposite ends of the roller lever 21. The roller lever 21 is constituted so as to lift the rubber roller 19 in an upper direction (the side of the cover body 2) via a shaft holder 20 upon receipt of a bias force of helical springs 22 having one end attached to the roller lever 21 and other end attached to the support board 1.

The front end on the side of the roller gear 16 of the roller shaft 18 is engaged with a cam groove 17a which is formed on a cam rod 17 passing through the roller gear 16. The cam groove 17a is provided with an inclined portion which is inclined downward (the side of the support board 1) toward the downstream side in the disk insertion direction 42. When the motor 5 generates a rotational force on the rotational shaft thereof, the rotational force is transmitted to each gear, and then, the roller shaft 18 is rotated and the cam rod 17 is moved in the disk insertion direction 42 or in the disk discharge direction 43. In this case, a front end on the side of the roller gear 16 of the roller shaft 18 is moved downward or upward along the cam groove 17a, so that the rubber roller 19 which is integrally engaged with the roller shaft 18 is also moved downward or upward. In addition, the shaft holder 20 holding the rubber roller 19 and a roller lever 21 fixing the shaft holder 20 are rotated centering around portions where the bearing holes 21a and 21b of the roller lever 21 are fitted to the above-described rotational shaft (not illustrated).

On the upper part of the rubber roller 19, a disk guide 50 for sandwiching the disk in cooperation with the rubber roller 19 and guiding the disk in the disk insertion direction 42 is attached to a clamp lever 25 which is elongated in a direction in parallel with the support board 1 and bisecting the disk insertion direction 42. The clamp lever 25 serves as a function of a disk guide fixing portion. The disk guide 50 is having a left disk guide 23 and a right disk guide 24 and is made of a material softer than the disk so as not to scratch the disk. For example, if the material of the disk is polycarbonate, the disk guide 50 is made of a resin such as polyacetal resin softer than polycarbonate. The constitution of the disk guide 50 will be described in detail later.

The clamp lever 25 is rotatably supported by the support board 1 by fitting the above-described rotational shaft (not illustrated) into bearing holes 25a and 25b which are formed on opposite ends of the clamp lever 25, as same as the roller lever 21. In this clamp lever 25, a pin 25c formed on one end thereof is engaged with a cam groove 17c formed on the downstream side in the disk insertion direction 42 from the cam groove 17a in the cam rod 17 and this controls a position of the clamp lever 25. The cam groove 17c is provided with an inclined portion which is inclined downward toward the downstream side in the disk insertion direction 42. One end of a clamp plate 26 formed by an elastic platy spring is screwed on a center portion of a upper surface of the clamp lever 25 so as to project to the downstream side in the disk insertion direction 42. The lower surface of other end of the clamp plate 26 rotatably supports a disk-like clamper 27. The clamp lever 25 and the clamp plate 26 may constitute one example of a clamp unit. If the cam rod 17 is moved in the disk insertion direction 42 or in the disk discharge direction 43 due to the rotational force of the rotational shaft of the motor 5, the clamp lever 25 to be engaged with the cam rod 17 in the cam groove 17c and the clamp plate 26 attached to the clamp lever 25 are rotated centering around the part where the bearing holes 25a and 25b of the clamp lever 25 are fitted to the above-described rotational shaft (not illustrated). In this case, the clamper 27 is moved in a lower direction or in an upper direction.

On the lower surface in a vicinity of the disk insertion port 44 of the cover body 2, a guide 28 for guiding the disk into the interior part of the disk apparatus is attached. In addition, a P-plate 29 is fixed on the cover body 2, which is an L-shaped platy material adjacent to the guide 28 on the downstream side in the disk insertion direction 42. On the P-plate 29, two light-emitting diodes are soldered. On the lower surface on the downstream side in the disk insertion direction 42 of the cover body 2, a left centering lever 30 and a right centering lever 31 for positioning a disk of a standard diameter 8 cm (hereinafter, referred to as a small diametrical disk) on the turn table 3 are disposed. The left centering lever 30 and the right centering lever 31 are rotatably attached thereon by fitting a pair of rotational shafts (not illustrated) disposed on the cover body 2 into bearing holes 30a and 31a which are disposed on the left centering lever 30 and the right centering lever 31, respectively. In addition, the left centering lever 30 and the right centering lever 31 are movably engaged with each other by fitting an engagement pin (not illustrated) formed on one end of the right centering lever 30 into an engagement hole 30c which is disposed on one end of the left centering lever 30.

On the left centering lever 30, a bias spring 32 is attached to be biased in a counterclockwise direction centering around the bearing hole 30a. Depending on this bias spring 32, the right centering lever 31 movably engaged with the left centering lever 30 in the engagement hole 30c receives a force in a clockwise direction centering around the bearing hole 31a. In other words, a positioning pin 30b which is disposed on other end of the left centering lever 30 and a positioning pin 31b which is disposed on other end of the right centering lever 31 are biased by the bias spring 32 in a direction where they approach the turn table 3 each other.

On the upper surface of the right centering lever 31, a lock lever 33 is rotatably disposed. On an end at the downstream side in the disk insertion direction 42 of the lock lever 33, an engagement pin 33b is disposed. The engagement pin 33b may prevent the right centering lever 31 from being moved in a counterclockwise direction (a direction opened to the outside) centering around the bearing hole 31a by being engaged with a lock portion 2a which is formed in the cover body 2. In addition, the engagement pin 33b may prevent the left centering lever 30 which is engaged with a pin (not illustrated) formed on one end of the right centering lever 31 in the engagement hole 30c from being moved in a clockwise direction centering around the bearing hole 30a. In other words, the left centering lever 30 and the right centering lever 31 are prevented from being moved in the direction opened to the outside by engaging the engagement pin 33b with the lock portion 2a. On an end at the upstream side in the disk insertion direction 42 of the lock lever 33, a contact pin 33a is provided. The contact pin 33a may rotate a main body of the lock lever 33 in the counterclockwise direction with bringing into contact with the disk and being suppressed in the disk insertion direction 42 so as to be capable of releasing the engagement between the engagement pin 33b and the lock portion 2a. In addition, the lock lever 33 is biased in a direction where the engagement pin 33b is engaged with the lock portion 2a by the spring 34 which is disposed on the right centering lever 31 (namely, the clockwise direction). As a result, the lock lever 33 has the engagement pin 33b which is normally engaged with the lock portion 2a to be locked. In addition, the right centering lever 31 connected to the lock lever 33 and the left centering lever 30 connected to the right centering lever 31 are also locked.

On the lower surface of the right centering lever 31, a trigger lever 35 for triggering the cam rod 17 with bringing into contact with the disk is rotatably disposed. On an end at the center side of the disk apparatus of the trigger lever 35, a contact pin 35a is disposed to bring into contact with the disk, and on an end at the opposite side of the trigger lever 35, a moving pin 35b to be engaged with a cam groove 36a disposed on a trigger rod 36 is disposed. In addition, the trigger lever 35 is biased in a direction opposite of the lock lever 33, namely, the counterclockwise direction by the spring 34.

The trigger rod 36 is slidably guided to be attached to the support board 1 and depending on the rotational operation of the trigger lever 35, the trigger rod 36 is moved in the disk insertion direction 42 or in the disk discharge direction 43, and then, the trigger rod 36 is movably disposed in a direction bisecting the disk insertion direction 42. In addition, the trigger rod 36 is normally biased by the springs 22 so as to stand ready on the downstream side in the disk insertion direction 42. The trigger rod 36 is moved in the disk discharge direction 43 and then, bringing into contact with the cam rod 17, the trigger rod 36 may press the cam rod 17 in the disk insertion direction 42. In addition, when the trigger rod 36 is moved in a direction bisecting the disk insertion direction 42, guiding the driving pin 35b by the cam groove 36a, the trigger rod 36 may rotate the trigger lever 35 in the clockwise direction. Being suppressed by the trigger rod 36 and being moved in the disk insertion direction 42, the cam rod 17 may allow a rack 17c disposed on the cam rod 17 to engage with the driving gear 15 in the middle of that operation. In addition, the cam rod 17 is provided with a cam groove 17d for moving the trigger rod 36 in a direction bisecting the disk insertion direction 42.

On the support board 1, a mechanical P-plate 39 having a switch 38 for detecting a terminal end of moving of the cam rod 17 disposed thereon is fixed. On the mechanical P-plate 39, light receiving elements 40 and 41 for detecting a light of a light-emitting diode disposed on the P-plate 29 are disposed. The light receiving element 40 is provided in a vicinity of the upstream side in the disk insertion direction 42 on the center part of the rubber roller 19 and when the disk is inserted therein, the light receiving element 40 may detect that the light is shielded by the disk. The light receiving element 41 is provided in the right vicinity of the downstream side in the disk insertion direction 42 on the center part of the rubber roller 19 and when the disk is discharged there from, the light receiving element 41 may detect that the shielded light by the disk is received.

The disk apparatus according to the first embodiment of the present invention is constituted as follows.

Further, in the disk apparatus according to the first embodiment of the present invention, an example of a disk conveying device is formed by the motor 5, the first pulley 6, the belt 7, the second pulley 8, the helical gear 9, the gear shaft 10, the worm gear 11, the helical gear 12, the relay gear 13, the roller gear 16, the cam rod 17, the roller shaft 18, the rubber roller 19, the shaft holder 20, and the roller lever 21.

In addition, in the disk apparatus according to the first embodiment of the present invention, an example of a disk clamp device is formed by the motor 5, the first pulley 6, the belt 7, the second pulley 8, the helical gear 9, the gear shaft 10, the worm gear 11, the helical gear 12, the relay gear 13, the relay gear 14, the driving gear 15, the cam rod 17, the clamp lever 25, the clamp plate 26, and the clamper 27.

In addition, in the disk apparatus according to the first embodiment, an example of a driving mechanism is formed by the motor 5, the first pulley 6, the belt 7, the second pulley 8, the helical gear 9, the gear shaft 10, the worm gear 11, the helical gear 12, the relay gear 13, the relay gear 14, the driving gear 15, and the cam rod 17.

Next, an operation of the disk apparatus according to the first embodiment of the present invention will be described with reference to FIG. 1.

At first, a loading operation of a small diametrical disk will be described.

When the small diametrical disk is inserted from the disk insertion direction 42 by an user, the small diametrical disk is guided by the guide 28 to be introduced in the disk apparatus and at first, a light of the light-emitting diode attached to the P-plate 29 is shielded for the light receiving element 40. When the light receiving element 40 detects that the light of the light-emitting diode is shielded, the motor 5 may generate the rotational force on the rotational shaft thereof. The rotational force of the rotational shaft of the motor 5 is decelerated via the first pulley 6, the belt 7, the second pulley 8, the helical gear 9, the gear shaft 10, the worm gear 11, the helical gear 12, and the relay gear 13, and then, the rotational force of the rotational shaft of the motor 5 is transmitted to the roller gear 16. In this case, the driving gear 15 is rotated from the helical gear 12 via the relay gear 14, however, the driving gear 15 is not engaged with the rack 17c in the cam rod 17 yet, so that the driving gear 15 runs idle. If the rotational force of the rotational shaft of the motor 5 is transmitted to rotate the roller gear 16, in accordance with this, the roller shaft 18 is rotated and the rubber roller 19 engaged with the roller shaft 18 also starts a rotation due to a frictional force together with the roller shaft 18. In this case, the roller shaft 18 is biased in an upper direction by a pair of springs 22 via the roller lever 21 and the shaft holder 20 so as to stand ready on an upper part of the cam groove 17a in the cam rod 17. In addition, in this case, the rubber roller 19 has a gap for the disk guide 50, so that the rubber roller 19 runs idle by the rotation of the roller shaft 18.

Further, when the user inserts the small diametrical disk in the disk insertion direction 42, the small diametrical disk brings into contact with the rubber roller 19 to be sandwiched between the rubber roller 19 and the disk guide 50. In this case, the small diametrical disk is suppressed on the disk guide 50 upon receipt of a bias force in the upper direction of the springs 22 via the rubber roller 19. In this case, the rubber roller 19 sandwiched between the roller shaft 18 and the small diametrical disk has a large rotational force because the frictional force on the roller shaft 18 is increased. The small diametrical disk sandwiched between the rubber roller 19 and the disk guide 50 is conveyed in the disk insertion direction 42 upon receipt of the rotational force of this rubber roller 19.

Further, when the small diametrical disk is conveyed due to the rotational force of the rotational shaft of the motor 5, the small diametrical disk is guided by the disk guide 50 to pass through a gap between the turn table 3 and the clamper 27. After that, the small diametrical disk brings into contact with the contact pin 35a of the trigger lever 35, and then, the small diametrical disk brings into contact with the positioning pin 30b of the left centering lever 30 and the positioning pin 31b of the right centering lever 31. In this case, the contact pin 33a of the lock lever 33 which is disposed on the right centering lever 31 is engaged with the lock portion 2a of the cover body 2 because the contact pin 33a does not bring into contact with the small diametrical disk. In other words, movements of the right centering lever 31 and the left centering lever 30 are controlled. More specifically, a rotation in the counterclockwise direction of the right centering lever 31 is controlled and a rotation in the clockwise direction of the left centering lever 30 is controlled. As a result, movement in the disk insertion direction 42 of the small diametrical disk is controlled by bringing into contact with the positioning pin 30b of the left centering lever 30 and the positioning pin 31b of the right centering lever 31, of which rotations are controlled. Thereby, the small diametrical disk is positioned on the disk mounting preparation position (coaxially separated in a vicinity of the disk recording reproduction position (for example, the upper part of FIG. 1)) opposed to the disk recording reproduction position. Here, the disk recording reproduction position represents a position where the disk is mounted on the turntable 3 and reproduction or reproduction and recording can be made.

In addition, in this case, when the contact pin 35a is suppressed by the small diametrical disk, the trigger lever 35 which is rotatably disposed on the right centering lever 31 is rotated in the clockwise direction and the driving pin 35b is moved in the disk discharge direction 43. The driving pin 35b is engaged with the cam groove 36a in the trigger rod 36, so that the trigger rod 36 is also moved in the disk discharge direction 43 due to the movement of the driving pin 35b in the disk discharge direction 43.

Bringing into contact with the cam rod 17 which is disposed on the upper stream side in the disk insertion direction 42 from the trigger rod 36, the trigger rod 36 moving in the disk discharge direction 43 by the trigger lever 35 may suppress the cam rod 17 in the disk discharge direction 43. The cam rod 17 suppressed by the trigger rod 36 is engaged with the driving gear 15 in the rack 17c and upon receipt of the rotational force of the driving gear 15 running idle receiving the rotational force of the rotational shaft of the motor 5, the cam rod 17 is further moved in the disk insertion direction 42.

In the cam rod 17, the cam groove 17a having one inclined portion inclined downward toward the downstream side in the disk insertion direction 42, which is engaged with the roller shaft 18, and the cam groove 17b having other inclined portion inclined downward toward the downstream side in the disk insertion direction 42, which is engaged with the pin 25c disposed on the clamp lever 25, are formed. In accordance with movement in the disk discharge direction 43 of the cam rod 17, the roller shaft 19 is pressed down in a lower direction by the cam groove 17a and the pin 25c of the clamp lever 25 is pressed down in the lower direction by the cam groove 17b.

When the roller shaft 18 is pressed down, the rubber roller 19 to be engaged with the roller shaft 18 is also pressed down. Thereby, the small diametrical disk comes down in the lower direction together with the rubber roller 19. In addition, if the engagement pin 25c is pressed down at the same time, the clamp lever 25 is rotated in a clockwise direction centering around portions where the bearing holes 21*a* and 21*b* are fitted to the above-described pair of rotational shafts (not illustrated) disposed on the support board 1. According to this, the clamp lever 25 presses down the clamper 27 via the clamp plate 26 so as to allow the clamper 27 to bring into contact with the small diametrical disk located at the disk mounting preparation position. The roller gear 16 inserted in the roller shaft 18 with pressure is coming down during this time, so that engagement between the relay gear 13 and the roller gear 16 is free and the rotation of the rubber roller 19 is stopped.

During the period from the trigger lever 35 moves the trigger rod 36 to the roller gear 16 is stopped, the small diametrical disk may stop its movement. On the other hand, since the rubber roller 19 and the roller shaft 18 transmit the driving force by the frictional force, the rubber roller 19 and the roller shaft 18 can slip. Therefore, the rotation of the roller shaft 18 is not restrained, so that the rotation of the rotational shaft of the motor 5 is not stopped. As a result, the cam rod 17 continues to move due to the rotational force of the rotational shaft of the motor 5 in the disk discharge direction 43.

Further, when the cam rod 17 continues to move in the disk discharge direction 43, the rubber roller 19 completely departs from the small diametrical disk to move to a predetermined ready position in reproduction or recording. In addition, in this case, the clamp lever 25 also continues to rotate in the clockwise direction at the same time, and pressing down the small diametric disk via the clamper 27, the clamp lever 25 suppresses the small diametrical disk on the turn table 3. In this case, the clamp plate 26 is elastically deformed to suppress the small diametrical disk on the turn table 3 via the clamper 27 with a predetermined pressure.

Further, when the cam rod 17 is moved in the disk discharge direction 43, the trigger rod 36 is moved by the cam groove 17*d* in a center direction of the disk apparatus. If the trigger rod 36 is moved, the driving pin 35*b* of the trigger lever 35 is suppressed by the cam groove 36*a* in the disk discharge direction 43. Thereby, the trigger lever 35 may rotate the contact pin 35*a* in a direction departing from the small diametrical disk (namely, the clockwise direction). From these operations, the small diametrical disk is completely mounted to the disk recording reproduction position.

On the other hand, the cam rod 17 moving in the disk discharge direction 43 may finally bring into contact with the switch 38 so as to turn ON the switch 38. When the switch 38 is turned ON, the rotational shaft of the motor 5 stops the rotation and loading is completed. Thereby, rotating the small diametrical disk by means of the turn table 3, the optical pickup 4 can reproduce or reproduce and record the small diametrical disk.

Next, a discharge operation of the small diametrical disk will be described.

In the discharge operation of the small diametrical disk, a reverse operation from the loading operation will be basically carried out.

When start of the discharge operation of the small diametrical disk is instructed by pressing an inject button which is separately provided to the disk apparatus or the like, the motor 5 may generate the rotational force on the rotational shaft thereof in a reversed direction from the loading operation. Then, the rotational force of the rotational shaft of the motor 5 is transmitted to the driving gear 15 by means of each gear so as to move the cam rod 17 in the disk insertion direction 42. In accordance with this movement of the cam rod 17, the roller shaft 18 and the pin 25*c* of the clamp lever 25 are moved in the upper direction by the cam grooves 17*a* and 17*b*. In accordance with this operation, the clamp lever 25 may lift the clamber 27 via the clamp plate 26 so as to depart the clamber 27 from the small diametrical disk. At the same time, the rubber roller 19 to be engaged with the roller shaft 18 may be moved in the upper direction so as to lift the small diametrical disk, and then, suppressing the small diametrical disk on the disk guide 50 so as to sandwich the small diametrical disk.

In accordance with movement of the roller shaft 18 in the upper direction, the engagement between the roller gear 16 and the relay gear 13 recovers and the rotational force of the rotational shaft of the motor 5 is transmitted to the roller gear 16. Having the rotational force of the rotational shaft of the motor 5 transmitted by means of the roller gear 16, the rubber roller 19 may be rotated in the reversed direction from the loading operation and may convey the small diametrical disk which is sandwiched by the rubber roller 19 in cooperation with the disk guide 50 in the disk discharge direction 43. In this case, the clamper 27 is completely retreated from the disk recording reproduction position and forms a gap between the clamper 27 and the turn table 3, so that the clamper 27 does not prevent the conveyance operation of the small diametrical disk. In addition, engagement between the rack 17*c* of the cam rod 17 moving in the disk insertion direction 42 and the driving gear 15 is finally free. Thereby, the cam rod 17 receives the bias force of the spring 37 which is hung on the trigger rod 36, and the cam rod 17 may return to an initial position.

Further, when the rubber roller 19 is rotated in the reversed direction and moves the small diametrical disk in the disk discharge direction 43, the light receiving element 41 may receive the light of the light-emitting diode of the P-plate 29 which is shielded by the small diametrical disk. Thereby, the motor 5 may stop the driving operation. In this case, the small diametrical disk is stopped being sandwiched by the rubber roller 19 because the light receiving element 41 is arranged on the downstream side in the disk insertion direction 42 from the rubber roller 19. Accordingly, the small diametrical disk does not fall down from the disk apparatus.

Next, a loading operation of a disk having a standard diameter 12 cm (hereinafter, referred to as a large diametrical disk) will be described.

When a user inserts the large diametrical disk from the disk insertion direction 42, the large diametrical disk is guided to the interior part of the disk apparatus by the guide 28 and at first, the large diametrical disk may shield the light of the light-emitting diode attached to the P-plate 29 for the light receiving element 40. If the light receiving element 40 detects that the light of the light-emitting diode is shielded, the motor 5 may generate the rotational force in the rotational shaft thereof. The rotational force of the motor 5 is decelerated via the first pulley 6, the belt 7, the second pulley 8, the helical gear 9, the gear shaft 10, the worm gear 11, the helical gear 12, and the relay gear 13, and then, the rotational force of the motor 5 is transmitted to the roller gear 16. In this case, the driving gear 15 is rotated from the helical gear 12 via the relay gear 14, however, the driving gear 15 is not engaged with the rack 17*c* in the cam rod 17 yet, so that the driving gear 15 runs idle. If the rotational force of the rotational shaft of the motor 5 is transmitted to rotate the roller gear 16, in accordance with this, the roller shaft 18 is rotated. Thereby, the rubber roller 19 engaged with the roller shaft 18 also starts the rotation due to a frictional force together with the roller shaft 18. In this case, the roller shaft 18 is biased in an upper direction by the pair of springs 22 via the roller lever 21 and the shaft holder 20 so as to stand ready on the upper part of the cam groove 17*a* in the cam rod 17. In addition, in this case, the rubber roller 19 has a gap for the disk guide 50, so that the rubber roller 19 runs idle by the rotation of the roller shaft 18.

Further, when the user inserts the large diametrical disk in the disk insertion direction 42, the large diametrical disk brings into contact with the rubber roller 19 to be sandwiched between the rubber roller 19 and the disk guide 50. In this case, the large diametrical disk is suppressed on the disk guide 50 upon receipt of the bias force in the upper direction of the springs 22 via the rubber roller 19. In this case, the rubber roller 19 sandwiched between the roller shaft 18 and the large diametrical disk has a large rotational force because the frictional force on the roller shaft 18 is increased. The large diametrical disk sandwiched between the rubber roller 19 and the disk guide 50 is conveyed in the disk insertion direction 42 upon receipt of the rotational force of this rubber roller 19.

Further, when the large diametrical disk is conveyed due to the rotational force of the rotational shaft of the motor 5, the large diametrical disk is guided by the disk guide 50 to pass through a gap between the turn table 3 and the clamper 27. After that, the large diametrical disk brings into contact with the contact pin 33*a* of the lock lever 33 to press the contact pin 33*a*. The lock lever 33 having the pressed contact pin 33*a* is rotated in the counterclockwise direction. Due to this rotation, the engagement pin 33*b* disposed on the end on an opposite side of the contact pin 33*a* is free from the lock portion 2*a* of the cover body 2, so that lock of each lever is retreated.

Further, when the large diametrical disk is conveyed due to the rotational force of the rotational shaft of the motor 5, the large diametrical disk brings into contact with the contact pin 35*a* of the trigger lever 35. After that, the large diametrical disk brings into contact with the contact pin 30*a* of the left centering lever 30 and the contact pin 31*a* of the right centering lever 31. In this case, the lock of the lock lever 33 is retreated, so that the trigger lever 35, the left centering lever 30, and the right centering lever 31 are pressed on the outer circumference of the large diametrical disk to be opened to the outside with their movements not controlled. In other words, the trigger lever 35 is rotated in the clockwise direction, the left centering lever 30 is rotated in the clockwise direction, and the right centering lever 31 is rotated in the counterclockwise direction.

Further, when the large diametrical disk is conveyed in the disk insertion direction 42 due to the rotational force of the rotational shaft of the motor 5, pressing the trigger lever 35, the left centering lever 30, and the right centering lever 31, the large diametrical disk finally brings into contact with a wall 1*a* of the support board 1 to stop. Thereby, the large diametrical disk is positioned on the disk mounting preparation position. In this case, since the contact pin 35*a* of the trigger lever 35 is rotated in the clockwise direction with being pressed by the large diametrical disk, the driving pin 35*b* which is disposed on the end of the opposite side of the contact pin 35*a* is moved in the disk discharge direction 43. Due to this movement of the driving pin 35*b* in the disk discharge direction 43, the trigger rod 36 which is engaged with the driving pin 35*b* by the cam groove 36*a* is also moved in the disk discharge direction 43.

The trigger rod 36 moving in the disk discharge direction 43 by the trigger lever 35 may suppress the cam rod 17 in the disk discharge direction 43 with bringing into contact with the cam rod 17 which is disposed on the upstream side in the disk insertion direction 42 from the trigger rod 36. The cam rod 17 suppressed by the trigger rod 36 is engaged with the driving gear 15 in the rack 17*c*. Thereby, the cam rod 17 is further moved in the disk insertion direction 42 upon receipt of the rotational force of the driving gear 15 running idle receiving the rotational force of the rotational shaft of the motor 5.

In the cam rod 17, the cam groove 17*a* having one inclined portion inclined downward toward the downstream side in the disk insertion direction 42, which is engaged with the roller shaft 18, and the cam groove 17*b* having other inclined portion inclined downward toward the downstream side in the disk insertion direction 42, which is engaged with the pin 25*c* disposed on the clamp lever 25, are formed. In accordance with movement in the disk discharge direction 43 of the cam rod 17, the roller shaft 19 is pressed down in a lower direction by the cam groove 17*a* and the pin 25*c* of the clam lever 25 is pressed down in the lower direction by the cam groove 17*b*.

When the roller shaft 18 is pressed down, the rubber roller 19 to be engaged with the roller shaft 18 is also pressed down. Thereby, the large diametrical disk comes down in the lower direction together with the rubber roller 19. In addition, if an engagement pin 25*c* is pressed down at the same time, the clamp lever 25 is rotated in a clockwise direction centering around portions where the bearing holes 21*a* and 21*b* are fitted to the above-described pair of rotational shafts (not illustrated) disposed on the support board 1. According to this, the clamp lever 25 presses down the clamper 27 via the clamp plate 26 so as to allow the clamper 27 to bring into contact with the large diametrical disk located at the disk mounting preparation position. The roller gear 16 inserted in the roller shaft 18 with pressure is coming down during this time, so that engagement between the relay gear 13 and the roller gear 16 is free and the rotation of the rubber roller 19 is stopped.

During the period from the trigger lever 35 moves the trigger rod 36 to the roller gear 16 is stopped, the large diametrical disk stops its movement. On the other hand, since the rubber roller 19 and the roller shaft 18 transmit the driving force by the frictional force, the rubber roller 19 and the roller shaft 18 can slip. Therefore, the rotation of the roller shaft 18 is not restrained, so that the rotation of the rotational shaft of the motor 5 is not stopped. As a result, the cam rod 17 continues to move due to the rotational force of the rotational shaft of the motor 5 in the disk discharge direction 43.

Further, when the cam rod 17 continues to move in the disk discharge direction 43, the rubber roller 19 completely departs from the large diametrical disk to move to a ready position in reproduction. In addition, in this case, the clamp lever 25 also continues to rotate in the clockwise direction at the same time, and pressing down the large diametric disk via the clamper 27, the clamp lever 25 suppresses the large diametrical disk on the turn table 3. In this case, the clamp plate 26 is elastically deformed to suppress the large diametrical disk on the turn table 3 via the clamper 27 with a predetermined pressure.

Further, when the cam rod 17 is moved in the disk discharge direction 43, the trigger rod 36 is moved by the cam groove 17*d* in a center direction of the disk apparatus. If the trigger rod 36 is moved, the driving pin 35*b* of the trigger lever 35 is suppressed by the cam groove 36*a* in the disk discharge direction 43. Thereby, the trigger lever 35 may rotate the contact pin 35*a* in a direction departing from the large diametrical disk (namely, the clockwise direction). From these operations, the large diametrical disk is completely mounted to the disk recording reproduction position.

On the other hand, the cam rod 17 moving in the disk discharge direction 43 may finally bring into contact with the switch 38 so as to turn ON the switch 38. When the switch 38 is turned ON, the rotational shaft of the motor 5 stops the rotation and loading is completed. Thereby, rotating the large diametrical disk by means of the turn table 3, the optical pickup 4 can reproduce or reproduce and record the large diametrical disk.

Next, a discharge operation of the large diametrical disk will be described.

In the discharge operation of the large diametrical disk, a reverse operation from the loading operation will be basically carried out.

When start of the discharge operation of the large diametrical disk is instructed by pressing an inject button which is separately provided to the disk apparatus or the like, the motor 5 may generate the rotational force on the rotational shaft thereof in a reversed direction from the loading operation. Then, the rotational force of the rotational shaft of the motor 5 is transmitted to the driving gear 15 by means of each gear so as to move the cam rod 17 in the disk insertion direction 42. In accordance with this movement of the cam rod 17, the roller shaft 18 and the pin 25c of the clamp lever 25 are moved in the upper direction by the cam grooves 17a and 17b. In accordance with this operation, the clamp lever 25 may lift the clamber 27 via the clamp plate 26 so as to depart the clamber 27 from the large diametrical disk. At the same time, the rubber roller 19 to be engaged with the roller shaft 18 may be moved in the upper direction so as to lift the large diametrical disk, and then, suppressing the large diametrical disk on the disk guide 50 so as to sandwich the large diametrical disk.

In accordance with movement of the roller shaft 18 in the upper direction, the engagement between the roller gear 16 and the relay gear 13 recovers and the rotational force of the rotational shaft of the motor 5 is transmitted to the roller gear 16. Having the rotational force of the rotational shaft of the motor 5 transmitted by means of the roller gear 16, the rubber roller 19 may be rotated in the reversed direction from the loading operation and may convey the large diametrical disk which is sandwiched by the rubber roller 19 in cooperation with the disk guide 50 in the disk discharge direction 43. In this case, the clamper 27 is completely retreated from the disk recording reproduction position and forms a gap between the clamper 27 and the turn table 3, so that the clamper 27 does not prevent the conveyance operation of the large diametrical disk. In addition, engagement between the rack 17c of the cam rod 17 moving in the disk insertion direction 42 and the driving gear 15 is finally free. Thereby, the cam rod 17 receives the bias force of the spring 37 which is hung on the trigger rod 36, and the cam rod 17 may return to an initial position.

Further, when the rubber roller 19 is rotated in the reversed direction and moves the large diametrical disk in the disk discharge direction 43, the light receiving element 41 may receive the light of the light-emitting diode of the P-plate 29 which is shielded by the large diametrical disk. Thereby, the motor 5 may stop the driving operation. In this case, the large diametrical disk is stopped being sandwiched by the rubber roller 19 because the light receiving element 41 is arranged on the downstream side in the disk insertion direction 42 from the rubber roller 19. Accordingly, the large diametrical disk does not fall down from the disk apparatus.

Next, a constitution of the disk guide 50 of the disk apparatus according to the first embodiment of the present invention will be described in detail with reference to FIGS. 1 to 5.

Figure 2:
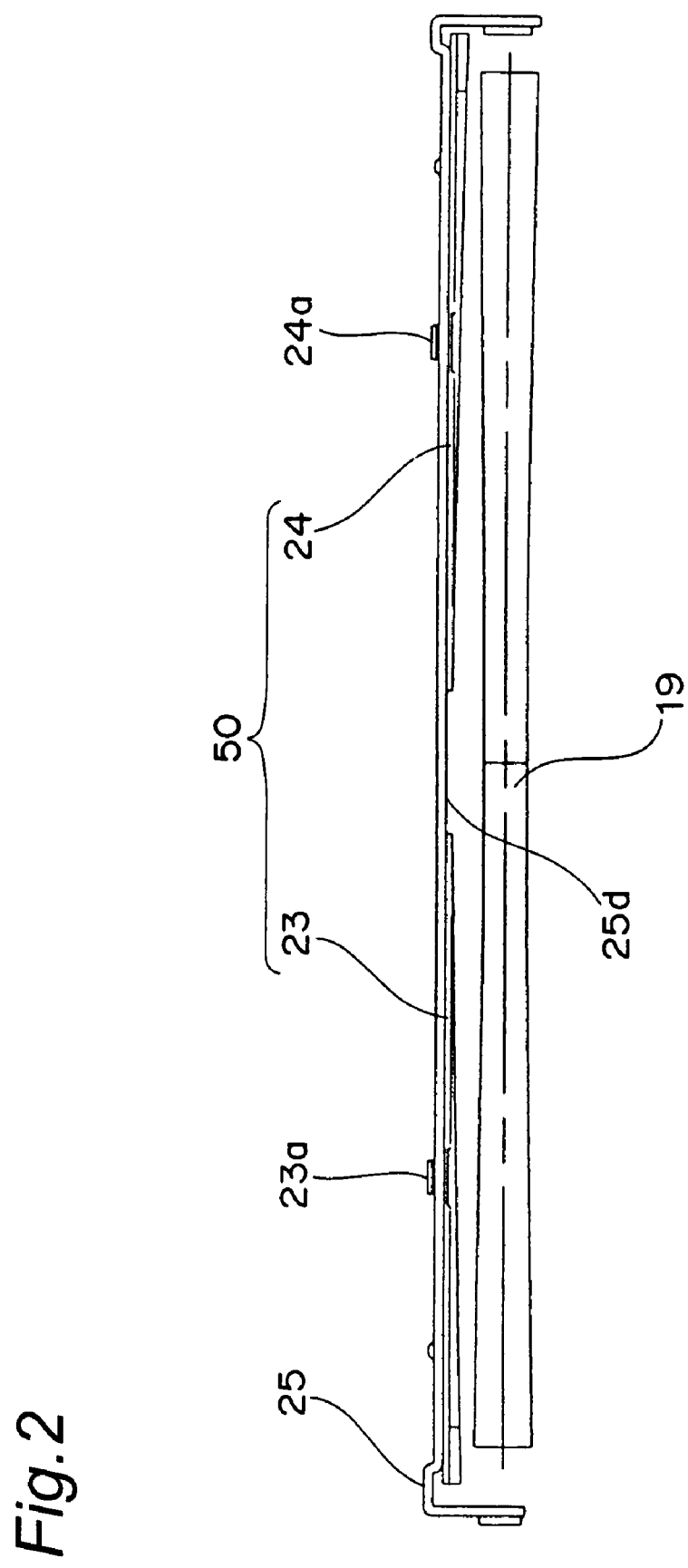
FIG. 2 is a front view showing shapes of a disk guide and a rubber roller of the disk apparatus according to the first embodiment of the present invention.
Figure 3:
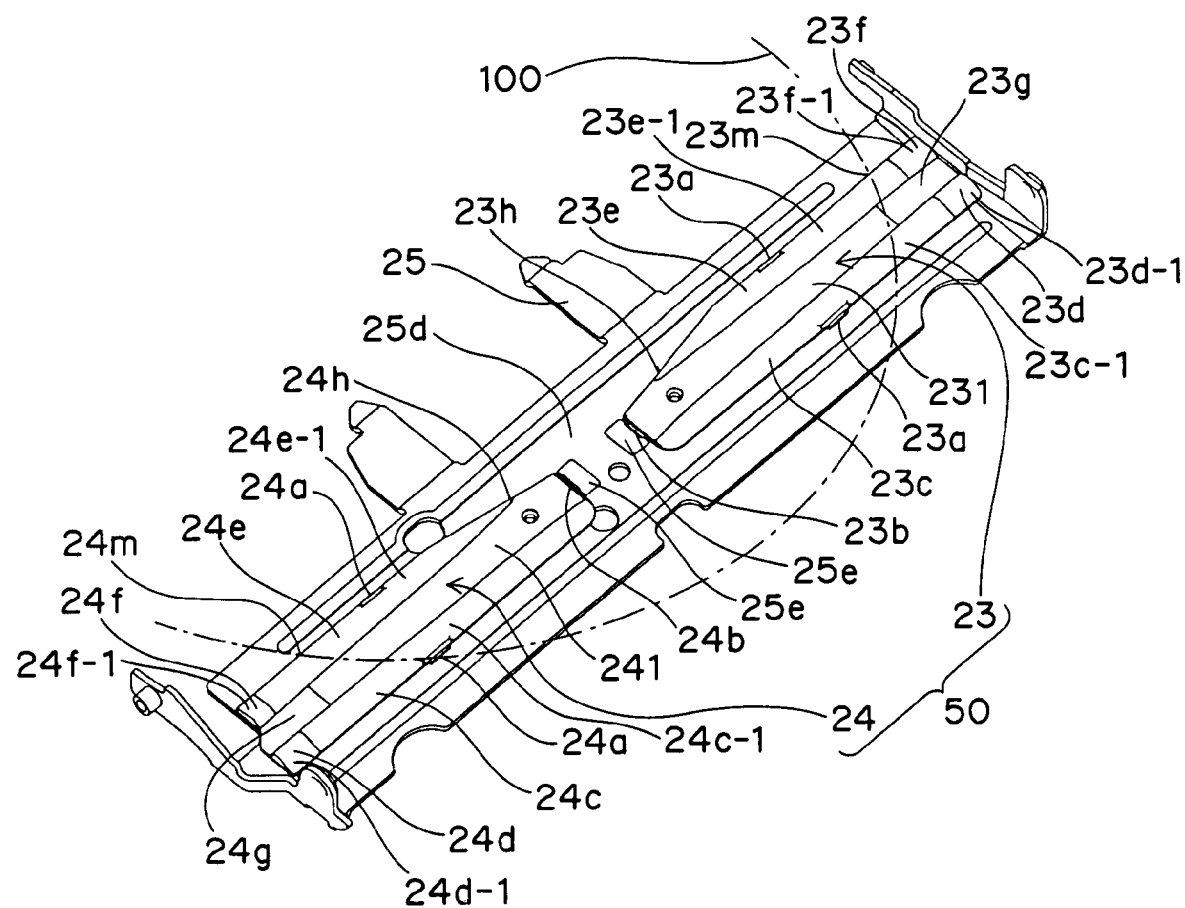
FIG. 3 is a perspective view showing a disk guide which is attached to a clamp lever of the disk apparatus according to the first embodiment of the present invention.
Figure 4A:
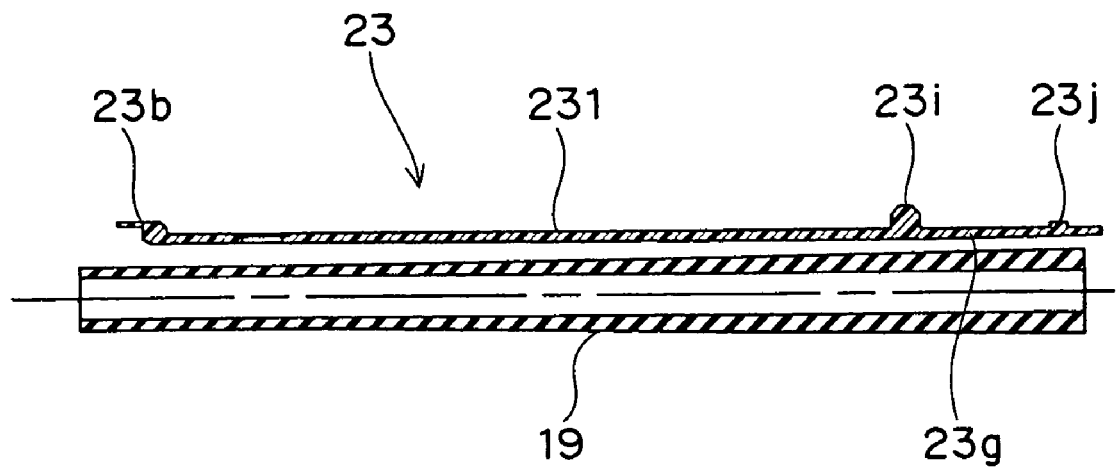
FIG. 4A is a cross sectional view of a left disk guide and the rubber roller of the disk apparatus according to the first embodiment of the present invention.
Figure 4B:
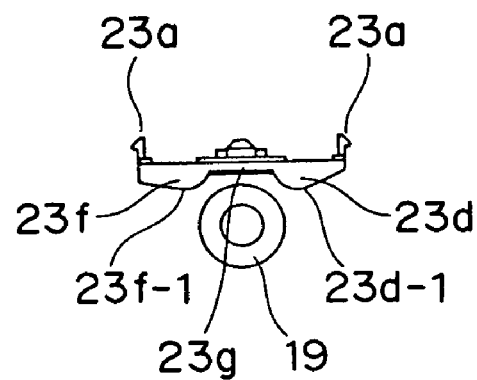
FIG. 4B is a side view of the left disk guide and the rubber roller of the disk apparatus according to the first embodiment of the present invention.

FIG. 2 is a front view showing shapes of the disk guide 50 and the rubber roller 19 of the disk apparatus according to the first embodiment of the present invention, FIG. 3 is a perspective view seeing the clamp lever 25 to which the disk guide 50 is attached from a side of a surface bringing into contact with the disk, FIG. 4A is a cross sectional view where the left dusk guide 23 and the rubber roller 19 are cut in parallel with the axis of the rubber roller 19, and FIG. 4B is a side view thereof. FIG. 4A and FIG. 4B only show a side of the left disk guide 23. In addition, FIG. 5 is a perspective view seeing the left disk guide 23 from a side bringing into contact with the disk.

The disk guide 50 has the left disk guide 23 and the right disk guide 24. The left disk guide 23 and the right disk guide 24 are formed so as to be approximately symmetrical to a line passing through a middle portion in a longitudinal direction of the disk insertion port 44 in the disk insertion direction 42 to be attached to the clamp lever 25. When the left disk guide 23 and the right disk guide 24 are attached in such a way, a distance between ends on sides far from each other (hereinafter, referred to as an outside) in the elongated direction of the left disk guide 23 and the right disk guide 24, namely, a direction bisecting the disk insertion direction 42 is determined so as to be not less than the diameter of the large diametrical disk. The clamp lever 25 is made of, for example, a steel plate with a high rigidity. An attaching surface 25d of the clamp lever 25 is formed to be flat.

Figure 5:
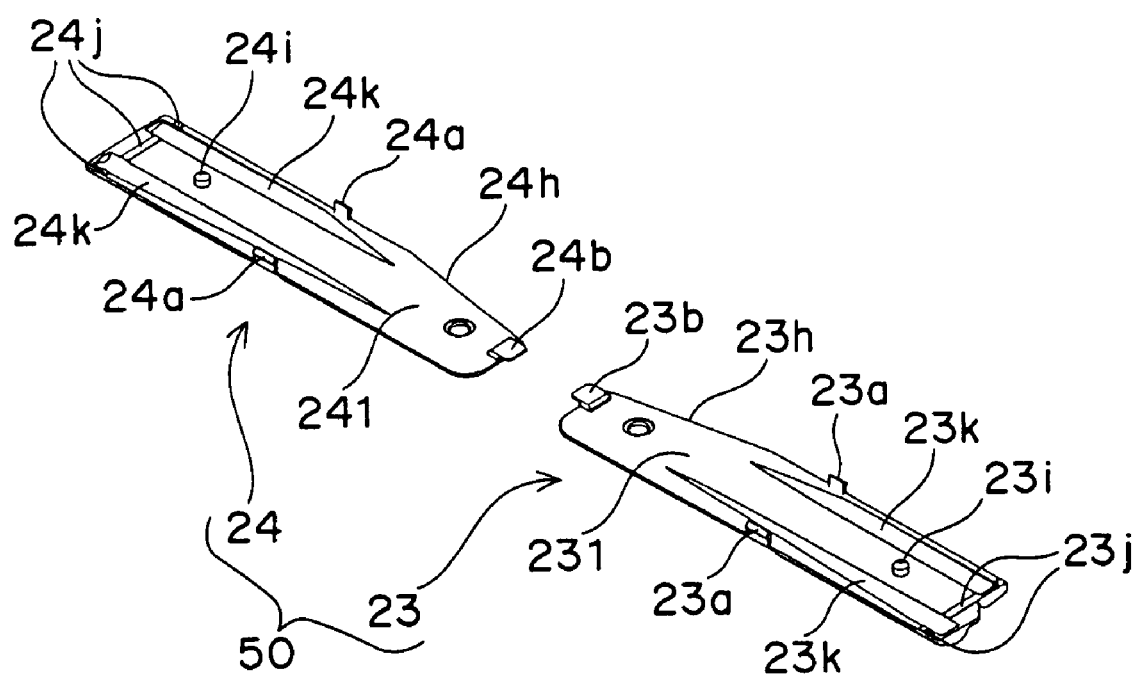
FIG. 5 is a perspective view showing the side of a disk contact surface of the disk guide of the disk apparatus according to the first embodiment of the present invention.

As shown in FIG. 5, the left disk guide 23 is provided with a platy guide board 231, a second hook 23b which is an example of an engagement portion disposed in a vicinity of one end of the guide board 231, a convex portion 23j which is disposed in a vicinity of other end of the guide board 231, and a pair of first hooks 23a which is disposed so as to be opposed with each other in the disk insertion direction 42 on a center part between the second hook 23b and the convex portion 23j and on an outer circumferential part of the guide board 231.

The convex portion 23j is formed in a shape so that an inclined angle of the left disk guide 23 and the clamp lever 25 can be kept when the left disk guide 23 is attached to the clamp lever 25. For example, the convex portion 23j is formed by a rod-like body or an aggregation of projections or the like which is elongated in the disk insertion direction 42 as shown in FIG. 5. A height of the convex portion 23j is determined so as to be larger than a deformation due to warpage of the left disk guide 23 (for example, about 0.2 mm). If the convex portion 23j is disposed too inside from an edge portion of the guide board 231, a contact area becomes too large when the left disk guide 23 brings into contact with the disk and this leads to the fact that the disk is easily scratched. On the other hand, if the convex portion 23j is disposed too near the edge portion of the guide board 231, a thickness thereof is made thin due to a sink generated upon molding and its height may be reduced. Therefore, it is preferable that the convex portion 23j is disposed slightly inside from the edge portion of the guide board 231. In addition, normally, information in the disk is not recorded in the range inside from the outer circumferential part of the disk less than 1 mm. As a result, although the left disk guide 23 basically brings into contact with an upper edge portion 100a on the outer circumferential part of the disk, it is preferable that the left disk guide 23 may bring into contact with the disk at least within 1 mm from the outer circumferential part.

In addition, the convex portion 23j may be formed integrally with the guide board 231. Alternatively, the convex portion 23j may be attached not to the guide board 231 but to the clamp lever 25 or may be integrally attached to the clamp lever 25.

The first hook 23a may be formed by a pair of members, but not limited to this and when the left disk guide 23 is attached to the clamp lever 25, a shape thereof is available if only the inclined angle between the left disk guide 23 and the clamp lever 25 may be kept. In addition, the first hooks 23a may be formed integrally with the second hook 23b. Between the convex portion 23j of the guide board 231 and the first hooks 23a, a columnar positioning pin 23i is provided, and may position the left disk guide 23 on the clamp lever 25 in cooperation with the second hook 23b.

On the position corresponding to projection guide portions (linearly connected projections) 23c to 23f to be described later of the left disk guide 23, a groove 23k for preventing a sink is provided. In addition, on a side near the right disk guide 24 and on the downstream side in the disk insertion direction 42 of the left disk guide 23, a notch 23h is obliquely provided. The notch 23h is provided on the position approximately coincides with the outer circumferential part of the small diametrical disk which is mounted on the disk mounting preparation position in order to prevent the small diametrical disk from being scratched when the small diametrical disk hits against the left disk guide 23. In addition, on the attaching surface 25d of the clamp lever 25, a half blanking process 25e is applied so as to prevent the second hook 23b from leaping through a rear side of an attaching surface 25d of the clamp lever 25.

On an outer circumferential part which is the opposite side of the surface on which the convex portion 23j, the first hook 23a, and the second hold 23b of the platy guide board 231 are provided and is opposed with each other in the disk insertion direction 42, as shown in FIG. 3, the projection guide portions 23c, 23d, 23e, and 23f are formed. The projection guide portions 23c and 23d are provided so as to be located on the upstream side in the disk insertion direction 42 when they are attached to the clamp lever 25. In addition, the projection guide portions 23e and 23f are provided so as to be located on the downstream in the disk insertion direction 42. In addition, the projection guide portions 23d and 23f are provided so as to be located on a side which is kept away from the right disk guide 24 and the projection guide portions 23c and 23e are provided so as to be located on a side approaching the right disk guide 24.

The projection guide portions 23c to 23f may project so as to approach the rubber roller 19 from the side near the right disk guide 24 as it reaches the outside. In other words, the projection guide portions 23c to 23f are formed so that their thicknesses near the right disk guide 24 are decreased and their thicknesses are increased as it reaches the outside. An inclined angle of the projection guide portion 23d for the guide board 231 may be larger than an inclined angle of the projection guide portion 23c for the guide board 231, and an inclined angle of the projection guide portion 23f for the guide board 231 may be larger than an inclined angle of the projection guide portion 23e for the guide board 231. For example, the inclined angles of the projection guide portions 23d and 23f for the guide board 231 are about 2° and the inclined angles of the projection guide portions 23c and 23e for the guide board 231 are about 1°. In addition, heights of the projection guide portions 23e and 23f are formed so as to be lower than heights of the projection guide portions 23c and 23d. Further, as shown in FIG. 4B, cross sections of the projection guide portions 23c to 23f are formed in a circle mountain shape. Reliefs of top portions (hereinafter, referred to as ridge line portions) 23c-1 to 23f-1 of these projection guide portions 23c to 23f are linearly formed when projection guide portions 23c to 23f are not attached to the clamp lever 25.

Between the projection guide portions 23e to 23f and the projection guide portions 23c to 23d, as shown in FIG. 4B, a valley 23g is formed so that an outside end portion of the rubber roller 19 of which diameter is increased as it reaches the outside can enter vertically the valley 23g. Thereby, even if a thin disk is inserted, this disk can be certainly sandwiched between the rubber roller 19 and the left disk guide 23. A vicinity portion on the outside end of the valley 23g is formed so as to be thinner as it reaches the outside so as not to deform the rubber roller 19 in a stand-ready state contacting the vicinity of the outside end of the rubber roller 19.

The left dusk guide 23 is constituted as follows.

According to the first embodiment of the present invention, the right disk guide 24 is formed to be approximately symmetric to the left disk guide 23 for a line passing through the center portion of the disk insertion port 44 in the disk insertion direction 42, and a guide board 241, a first hook 24a, a second hook 24b, projection guide portions 24c to 24f, a valley 24g, a notch 24h, a positioning pin 24i, a convex portion 24j, and a groove 24k of the right disk guide 24 correspond to the guide board 231, the first hook 23a, the second hook 23b, the projection guide portions 23c to 23f, the valley 23g, the notch 23h, the positioning pin 23i, the convex portion 23j, and the groove 23k of the left disk guide 23, respectively, so that an explanation thereof is herein omitted.

Further, according to first embodiment of the present invention, an example of the guide member is formed by the guide boards 231 and 241, the projection guide portions 23c to 23f and 24c to 24f, the valleys 23g and 24g, the notches 23h and 24h, the positioning pins 23i and 24i, and the grooves 23k and 24k.

In addition, according to first embodiment of the present invention, the left disk guide 23 and the right disk guide 24 are provided to be approximately symmetric each other for the line passing through the center portion of the disk insertion port 44 in the disk insertion direction 42; however, the present invention is not limited to this. In other words, the left disk guide 23 and the right disk guide 24 may not be formed completely symmetrically.

Further, according to the first embodiment of the present invention, the disk guide fixing member for attaching the left disk guide 23 and the right disk guide 24 is constituted so as to be integrally provided to the clamp lever 25; however, the chassis 60 may be integrally provided with the left disk guide 23 and the right disk guide 24. In other words, the left disk guide 23 and the right disk guide 24 may be attached to the chassis 60.

Figure 6C:
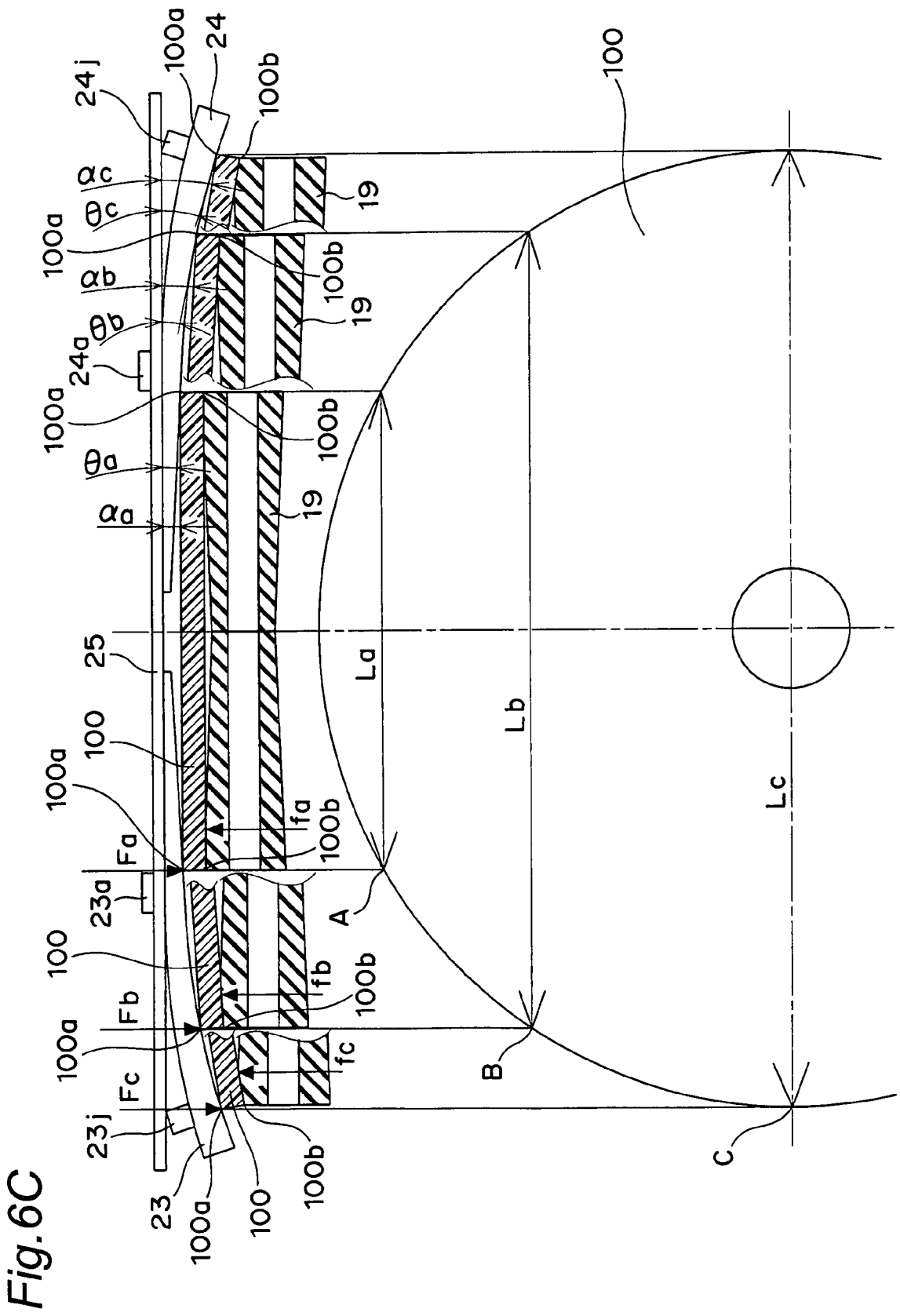
FIG. 6C is an explanatory view partially exaggerating a process that the large diametrical disk in loading is sandwiched between the disk guide and the rubber roller to be changed in the disk apparatus according to the first embodiment of the present invention.
Figure 7A:
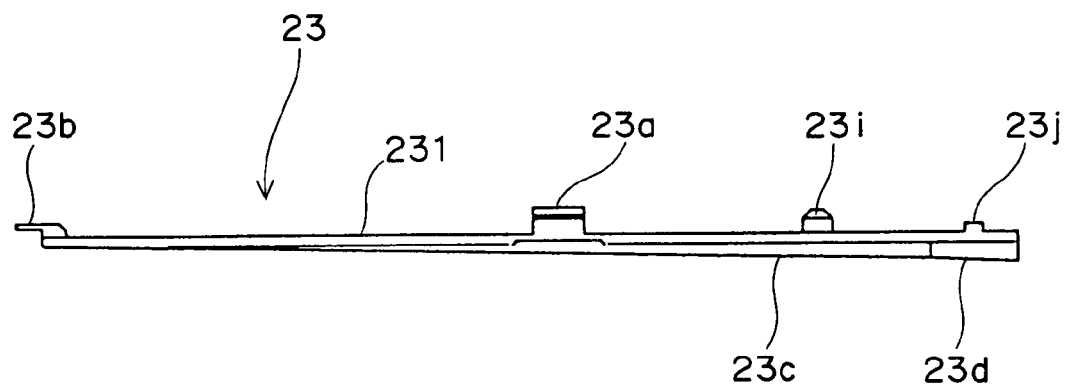
FIG. 7A is a front view showing the left disk guide of the disk apparatus according to the first embodiment of the present invention.
Figure 7B:
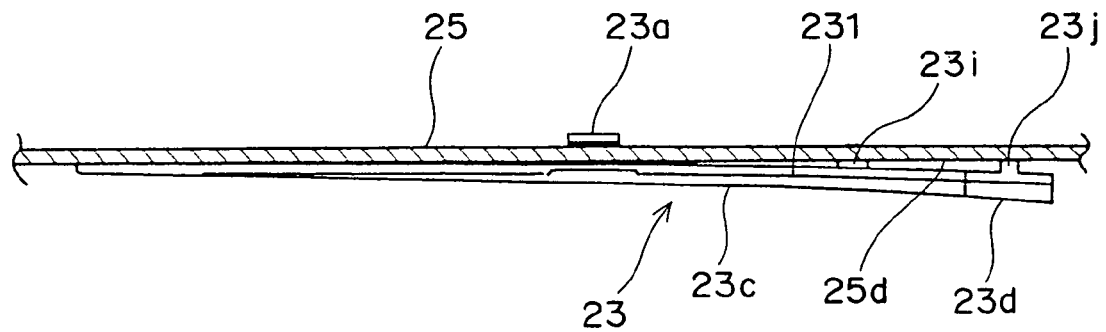
FIG. 7B is a cross sectional view showing a attaching state of the left disk guide in the disk apparatus according to the first embodiment of the present invention.

With respect to the disk guide 50 of the disk apparatus according to the first embodiment of the present invention, an operation thereof and operational effects of respective parts will be described with reference to FIG. 6A, FIG. 6B, and FIGS. 7A and 7B. FIG. 6A is a front side view (the disk is only represented by a cross sectional view) showing a state of a large diametrical disk 100 which is sandwiched between the disk guide and the rubber roller upon start of loading of the disk apparatus according to the first embodiment of the present invention. FIG. 6B is a cross sectional view showing the state of the large diametrical disk 100 which is sandwiched between the disk guide and the rubber roller in the middle of loading of the disk apparatus according to the first embodiment of the present invention. FIG. 7A is a front view showing the left disk guide 23. FIG. 7B is a cross sectional view showing an attached state of the left disk guide 23.

When the large diametrical disk 100 is inserted from the disk insertion port 44 in the disk insertion direction 42 by the user, the large diametrical disk 100 is sandwiched between the disk guide 50 and the rubber roller 19 to be conveyed by the disk conveying device in the disk insertion direction 42.

In this case, the disk guide 50 is formed so as to be inclined in a direction approaching the large diametrical disk 100 from a linear side (hereinafter, referred to as center part side) passing through the center part in the longitudinal direction of the disk insertion port 44 in the disk insertion direction 42, namely, in a direction far from the clamp lever 25. Therefore, the disk guide 50 brings into contact with only an upper edge portion 100a on the upper surface (the label surface) of the large diametrical disk 100 on a constant basis to guide movement of the large diametrical disk 100. In addition, the rubber roller 19 is formed so as to be inclined in a direction approaching the large diametrical disk 100 from the center part side as it reaches the outside in the same way. Therefore, the rubber roller 19 brings into contact with only a lower edge portion 100b on the recording surface of the large diametrical disk 100 on a constant basis to convey the large diametrical disk 100. As a result, the large diametrical disk 100 always brings into contact with the disk guide 50 and the rubber roller 19 on edge portions 100a and 100b, respectively. In this case, on the inside of the large diametrical disk 100, the disk guide 50 and the rubber roller 19 do no abut each other. In addition, a distance from one end to other end of the outside of the disk guide 50 is determined to be the length not less than the diameter of the disk 100. Accordingly, edge portions of the disk guide 50 do not abut on the inside of the large diametrical disk 100. Therefore, no scratch is generated on the inside of the large diametrical disk 100.

The larger a relative angle between the large diametrical disk 100 and a portion bringing into contact with the upper edge portion 100a of the large diametrical disk 100 in the disk guide 50 is, the larger a gap between the large diametrical disk 100 and the disk guide 50 is opened on the center part side from the upper edge portion 100a. Therefore, it is not feared that scratch is given to the large diametrical disk 100.

On the other hand, as shown in FIG. 6A, upon start of conveyance of the large diametrical disk 100, a thin portion on the center part side of the disk guide 50 is very near the large diametrical disk 100, so that it is feared that the thin portion of the disk guide 50 brings into contact with the inside of the large diametrical disk 100 if the thin portion of the disk guide 50 is deformed. In addition, the rubber roller 19 for pressing up the large diametrical disk 100 is made of a soft rubber in order to obtain a disk conveyance force, so that the rubber roller 19 is actually deformed by the pressing force to the large diametrical disk 100 so as to press up the slightly inside from the lower edge portion 100b of the large diametrical disk 100.

Therefore, the upper edge portion 100a of the large diametrical disk 100 is not moved with bringing into contact with the disk guide 50 and the slightly inside from the lower edge portion 100b of the large diametrical disk 100 is pressed up, so that the center part of the large diametrical disk 100 is deformed so as to be curbed in the upper direction 45 (in the mountain shape). Therefore, this results in that the large diametrical disk 100 is curved along the inclinations of the projection guide portions 23c to 23f and 24c to 24f of the disk guide 50 as it reaches the outer circumference. The inclination of this warpage is made larger as the contact position with respect to the disk guide 50 approaches the outside, and as shown in FIG. 6B, the inclination becomes largest when the upper edge portion 100a of the large diametrical disk 100 brings into contact with the disk guide 50. In the case that the relative angle between the disk guide 50 and the large diametrical disk 100 is small in the adjacent range of the contact portion thereof, the gap between the large diametrical disk 100 and the disk guide 50 is made small in this adjacent range. In other words, the gap between the upper surface of the large diametrical disk 100 and the disk guide 50 is made small. In addition, since the outside portion of the disk guide 50 is thick, a sink or a warpage is easily generated. If the disk guide 50 is deformed such as a sink or a warpage, the inclinations of the projection guide portions 23c to 23f and 24c to 24f are lost (the angles are made smaller), the relative angle in the adjacent range of the contact portion between the large diametrical disk 100 and the disk guide 50 is made small. Therefore, in the center part side from the adjacent range, the distance between the rear surface of the large diametrical disk 100 and the disk guide 50 is small. Therefore, in the adjacent range of the outer circumferential portion of the large diametrical disk 100, a dust or the like attached to the upper surface of the large diametrical disk 100 is dragged by the disk guide 50 and it is feared that a scratch is generated on the rear surface of the large diametrical disk 100. The material of the disk such as a CD and a DVD is polycarbonate, so that a static electricity is easily generated and the dust or the like is frequently attached to the surface thereof. Therefore, particularly, in the disk which is frequently used, it is difficult to prevent the scratch of the adjacent range of the outer circumferential part on the label surface side.

On the contrary, in the disk guide 50 according to the first embodiment of the present invention, the surface on the attaching side to the clamp layer 25 of the left disk guide 23 is formed to be flat except for the groove 23k for reducing a sink, and as described above, the convex portion 23j, the first hook 23a, and the second hook 23b are provided, respectively. In addition, also in the right disk guide 24, the convex portion 24j, the first hook 24a, and the second hook 24b are provided, respectively, in the same way. Hereinafter, a constitution and operational effects of the right disk guide 24 are the same as the left disk guide 23, so that only the left disk guide 23 will be described.

As shown in FIG. 7B, the convex portion 23j of the left disk guide 23 brings into contact with the attaching surface 25d of the clamp lever 25 to be tense and the first hook 23a and the second hook 23b are engaged to the clamp lever 25 so as to draw the portion on the center part side of the left disk guide 23 closer to the attaching surface 25d. Thereby, the left disk guide 23 is attached to the clamp lever 25 being deformed in an arc in a direction where the outside thereof is far from the attaching surface 25d. The left disk guide 23 is made of a resin and is elastically deformed, so that the left disk guide 23 presses the vicinity of the second hook 23b and the convex portion 23j on the attaching surface 25d by its elastic force.

Therefore, the left disk guide 23 is attached to the clamp lever 25 without rattle and the thin adjacent area of the second hook 23b does not float. In addition, assuming that a floating force acts, due to the second hook 23b, floating is controlled, so that the left disk guide 23 does not bring into contact with the large diametrical disk 100. Further, since the height of the convex portion 23j is determined so as to be larger than a warpage accuracy of the guide 23, the left disk guide 23 is elastically deformed on a constant basis to be fixed without rattle. Thereby, the gap between the label surface on the inside from the upper edge portion 100a of the large diametrical disk 100 and the disk guide 50 is not reduced by rattle or floating. As a result, it is possible to stably prevent the scratch of the disk. In addition, the reliefs of the ridge line portions 23c-1 to 23f-1 of these projection guide portions 23c to 23f are linearly formed in a single body; however, fixing the center part side of the left disk guide 23 by the hook 23a, the outside of the left disk guide 23 is deformed to the side of the large diametrical disk 100 by means of the convex portion 23j. In other words, when the left disk guide 23 is attached to the clamp lever 25, the left disk guide 23 is deformed so that inclinations of the ridge line portions 23c-1 to 23f-1 of these projection guide portions 23c to 23f are made larger as it reaches the outside. Therefore, even if the large diametrical disk 100 is pressed by the rubber roller 19 to be deformed in the upper direction 45, it is possible to secure a gap between the large diametrical disk 100 and the projection guide portions 23c to 23f, respectively. The ridge line portions 23c-1 to 23f-1 are linearly formed, so that the ridge line portions 23c-1 to 23f-1 can be easily managed in management of a product quality and a defect such as a sink or a warpage can be easily found. As a result, it is possible to prevent defective goods from flowing out to a market. In addition, the inclined angle for the guide board 231 of the projection guide portion 23d is determined to be larger than the inclined angle for the guide board 231 of the projection guide portion 23c, so that it is further possible to secure a gap between the large diametrical disk 100 and the projection guide portions 23c and 23d.

Further, by forming the reliefs of the ridge line portions 23c-1 and 23d-1 of the left disk guide 23 in a circular arc from beginning or combining some lines, it is possible to obtain the same effect by forming the reliefs of the ridge line portions 23c-1 and 23d-1 so that the inclination is made larger from the center part side as it reaches the outside. However, the management of the size of the inclined angle due to a local change such as a sink is difficult, so that this is not preferable. If the inclined angle of the projection guide portions 23c to 23f for the guide board 231 is made smaller even partially, on a portion where the sink is generated, there is provided no gap between the large diametrical disk 100 and the left disk guide 23 and this leads to the fact that the inside of the large diametrical disk 100 is easily scratched. Therefore, it is preferable that the reliefs of the ridge line portions 23c-1 to 23f-1 of these projection guide portions 23c to 23f are linearly formed like the left guide disk 23 according to the first embodiment of the present invention. By linearly forming the reliefs of the ridge line portions 23c-1 to 23f-1 of the projection guide portions 23c to 23f, management of the size of the inclined angle can be easily carried out and defect of molding such as a sink and a warpage can be also easily detected.

Further, by using FIG. 6C, the portions related to the above-described inclined angles between the disk guide 50 and the clamp lever 25 and between the disk guide 50 and the large diametrical disk 100 will be described in detail below. FIG. 6C is an explanatory view partially exaggerating a process that the large diametrical disk 100 in loading is sandwiched between the disk guide 50 and the rubber roller 19 to be changed. In FIG. 6C, a reference mark A denotes a position across the end of the large diametrical disk 100, a reference mark C denotes a position across the center part of the large diametrical disk 100, and a reference mark B denotes a position across the middle point between A and C.

As shown in FIG. 6C, the rubber roller 19 may press up the large diametrical disk 100 from the lower side of the large diametrical disk 100. On any position among A to C, the rubber roller 19 formed by an elastic body is deformed so as to press up the interior part from the lower edge portion 100b of the large diametrical disk 100 with suppressing forces fa, fb, and fc (FIG. 6C shows these suppressing forces only on the left disk side 23). On the contrary to this, the upper edge portion 100a of the large diametrical disk 100 is given the force in a direction where the disk 100 is pressed down with the suppressing forces Fa, Fb, and Fc (FIG. 6C shows these suppressing forces only on the left disk side 23) on the contact position with the left disk guide 23 and the right disk guide 24. In other words, the large diametrical disk 100 is given the force where the outside of the large diametrical disk 100 is curved in a direction of falling down.

On the other hand, in the case that the large diametrical disk 100 is sandwiched on the position A, a distance La between the contact positions where the large diametrical disk 100 brings into contact with the left disk guide 23 and the right disk guide 24 is shorter because the distance La is located on the edge portion of the large diametrical disk 100. Therefore, it is difficult for the large diametrical disk 100 to be deformed against the above-described curving force (the large diametrical disk 100 is hardly deformed), and a relative angle αa between the clamp lever 25 and the adjacent part of the upper edge portion 100a of the large diametrical disk 100 is approximately "0 (zero)".

However, in the case that the large diametrical disk 100 is sandwiched on the position B adjacent to the center part of the large diametrical disk 100 slightly than the position A, a distance Lb between the contact positions where the large diametrical disk 100 brings into contact with the left disk guide 23 and the right disk guide 24 is longer.

In addition, further, in the case that the large diametrical disk 100 is sandwiched on the position C across the center part of the large diametrical disk 100, a distance Lc between the contact positions where the large diametrical disk 100 brings into contact with the left disk guide 23 and the right disk guide 24 becomes the same as the diameter of the large diametrical disk 100 and is longer than the distance Lb.

Like the distances Lb and Lc, as the distance between the above-described contact positions is made longer, deformation of the large diametrical disk 100 against the curving force is made larger. In other words, defining the relative angle between the clamp lever 25 and the large diametrical disk 100 as αa on the position A, defining the relative angle between the clamp lever 25 and the large diametrical disk 100 as αb on the position B, and defining the relative angle between the clamp lever 25 and the large diametrical disk 100 as αc on the position C, a relation among them is defined as 0<αa<αb<αc. In other words, the relative angle between the clamp lever 25 and the large diametrical disk 100 becomes the largest on the position C.

On the other hand, each of the left disk guide 23 and the right disk guide 24 is attached to the clamp lever 25 on the first hooks 23a or 24a, and the convex portions 23j or 24j bring into contact with the clamp lever 25 to be deformed in a direction where the outside falls down. Therefore, the inclined angle between the right disk guide 24 (the left disk guide 23) and the clamp lever 25 is θb on the position B and θc on the position C, that is, gradually increased in θa<θb<θc.

Therefore, the relative angle between the large diametrical disk 100 and the right disk guide 24 (the left disk guide 23) is θa−αa on the position A, θb−αb on the position B, and θc−αc on the position C. Thereby, the large diametrical disk 100 can bring into contact with the right disk guide 24 (the left disk guide 23) at approximately the same angle.

As described above, by deforming the left disk guide 23 and the right disk guide 24 by the convex portion 23j or the convex portion 24j, the inclined angle for the clamp lever 25 can be gradually increased in θa→θb→θc. Thereby, with respect to the relative angle between the large diametrical disk 100 and the clamp lever 25, which is gradually increased in θa→θb→θc, the relative angle between the large diametrical disk 100 and the right disk guide 24 (the left disk guide 23), namely, θa−αa, θb−αb, and θc−αc can be made approximately the same angle, respectively.

Thereby, the interior part from the upper edge portion 100a of the large diametrical disk 100 and the gap between the left disk guide 23 and the right disk guide 24 can be secured. As a result, it is possible to prevent the area in the interior part of the large diametrical disk 100 from being scratched. In addition, since the inclined angle between the right disk guide 24 (the left disk guide 23) and the clamp lever 25 is gradually increased, as compared to the case of making this inclined angle constant (θa=θb=θc), it is also possible to reduce the thickness of the right disk guide 24 (the left disk guide 23).

As described above, according to the disk apparatus of the first embodiment of the present invention, without forming the reliefs of the ridge line portions 23c-1 to 23f-1 and 24c-1 to 24f-1 of the projection guide portions 23c to 23f and 24c to 24f of the disk guide 50 in a circle ark having a large curvature being difficult to manage a sink and a warpage and the like in management of a product quality, these reliefs are formed in a line whereby management of defects can be easily managed and which is a simple shape capable of being easily realized. In addition, providing the second hooks 23b and 24d on the end portion on the center part side of the disk guide 50, the convex portions 23j and 24j are provided on the end portion on the outside. Further, the first hooks 23a and 24a are provided between the second hooks 23b and 24b and the convex portions 23j and 24j of the disk guide 50. Thereby, as the disk approaches the outer circumferential part where the disk is easily scratched, the inclinations of the ridge line portions 23c-1 to 23f-1 and 24c-1 to 24f-1 of the disk guide 50 can be increased (can be curved), so that this makes it difficult to prevent the disk from being easily scratched. Further, according to this constitution, since the disk guide 50 is elastically attached to the clamp lever 25, rattle or floating is not generated. As a result, it is possible to further stably prevent scratch on the disk. On the other hand, in the case that the first hooks 23a and 24a or the second hooks 23b and 24b for fixing the disk guide 50 to the clamp lever 25 are formed inside from a peripheral part of the left disk guide 23 or the right disk guide 24, it is necessary to provide a hole for molding the first hooks 23a and 24a or the second hooks 23b and 24b on a mold for molding. Therefore, it is necessary for the mold for molding this hole to be a biting structure, and due to a piece of this mold, it is feared that flow of a resin around the hole is prevented. In this case, a straightness of the ridge line portion of each projection guide portion is deteriorated, and in a vicinity of the contact portion between the disk and the disk guide 50, the inclination between the disk and the disk guide 50 may be reduced. On the contrary, according to the disk apparatus of the first embodiment of the present invention, the first hooks 23a and 24a or the second hooks 23b and 24b for fixing the disk guide 50 on the clamp lever 25 are formed so as to be directed the outside from the peripheral part of the left disk guide 23 or the right disk die 24 (for example, in FIG. 5, the first hooks 23a and 24a are directed upper-right, the second hook 23 is directed upper-left, and the second hook 24b is directed lower-right). As a result, there is no biting and the resin upon molding is smoothly flown, so that a molding accuracy of the member is improved. In addition, by structuring the disk guide 50 by means of two members, namely, the left disk guide 23 and the right disk guide 24, the length of one member is made shorter and a warpage accuracy is also improved. In addition, since the reliefs of the ridge line portions 23c-1 to 23f-1 and 24c-1 to 24f-1 of the projection guide portions 23c to 23f and 24c to 24f are linearly formed, so that a molding accuracy of the member can be improved. As a result, a quality of the disk guide 50 is stabilized.

In addition, due to the convex portions 23j and 24j provided on the end of the outside, it is possible to make the inclination larger as it reaches the outside needing the angle of inclination. In this case, it is not necessary to make the inclination larger across the entire length of the disk guide 50, so that the disk apparatus can be made easily thin.

In addition, the projection guide portions 23c, 24c, 23d, and 24d on the upstream side in the disk insertion direction 42 are formed so as to be higher than the projection guide portions 23e, 24e, 23f, and 24f on the downstream side in the disk insertion direction 42. Therefore, the disk is guided along these projection guide portions 23c to 23f and 24c to 24f to the upper direction 45 toward the downstream side in the disk insertion direction 42. This makes it possible to secure the gap between the disk and the turn table 3, so that there is no fear that the inside of the disk is scratched.

Figure 8A:
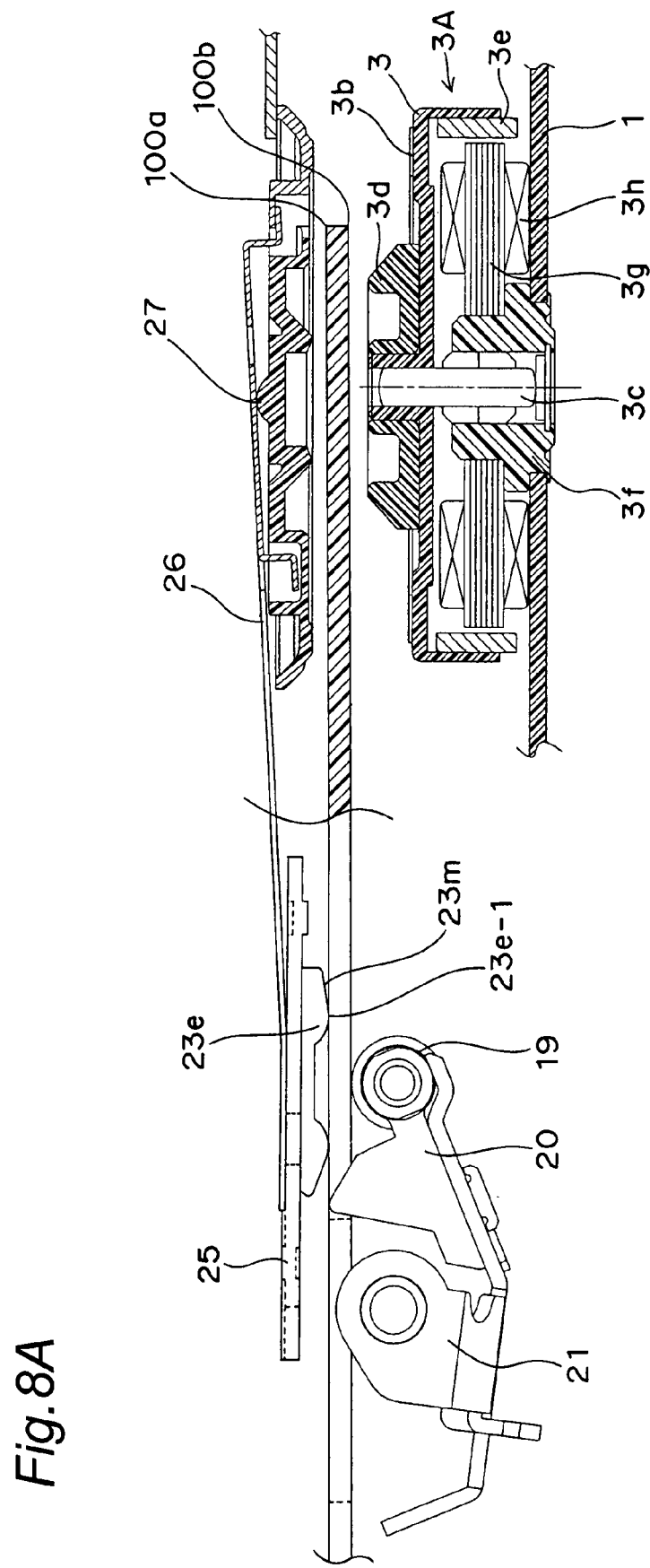
FIG. 8A is a partial side sectional view showing a state in the middle of loading operation of the large diametrical disk of the disk apparatus according to the first embodiment of the present invention.
Figure 8B:
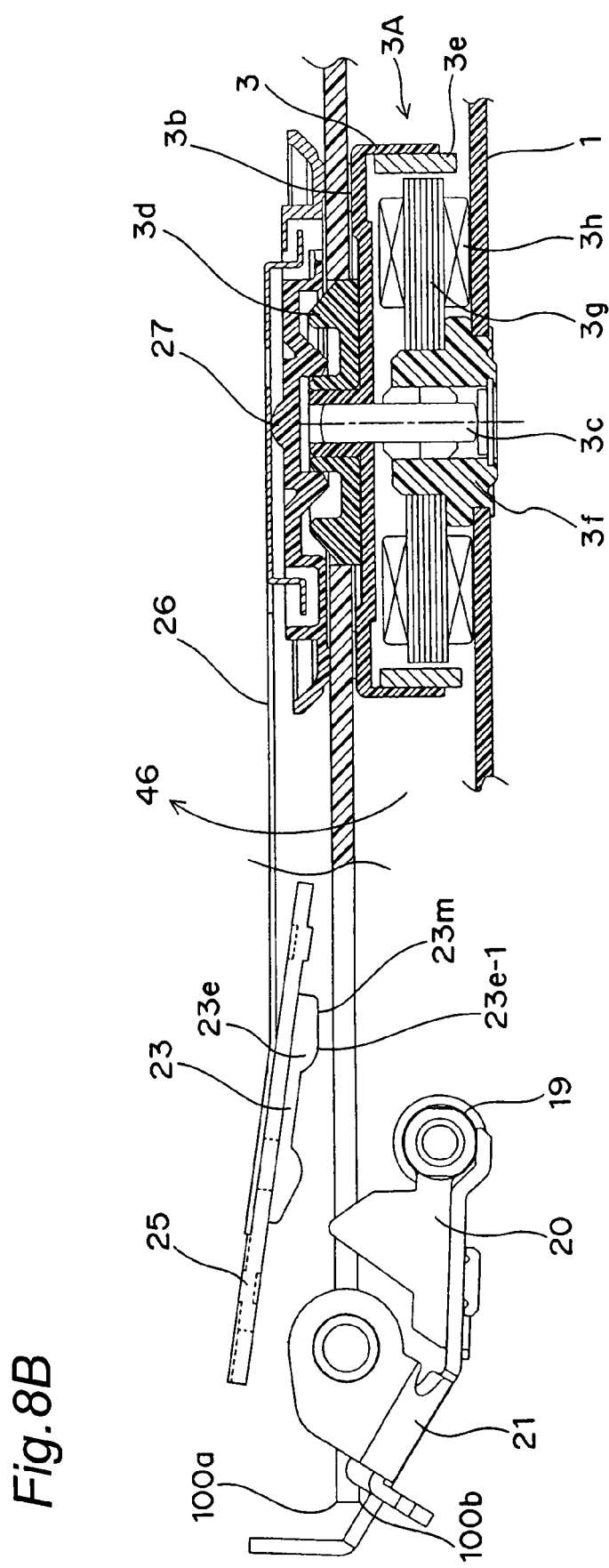
FIG. 8B is a partial side sectional view showing a state that the large diametrical disk in the disk apparatus according to the first embodiment of the present invention is mounted on a surface of a turn table approximately in parallel with this surface.
Figure 8C:
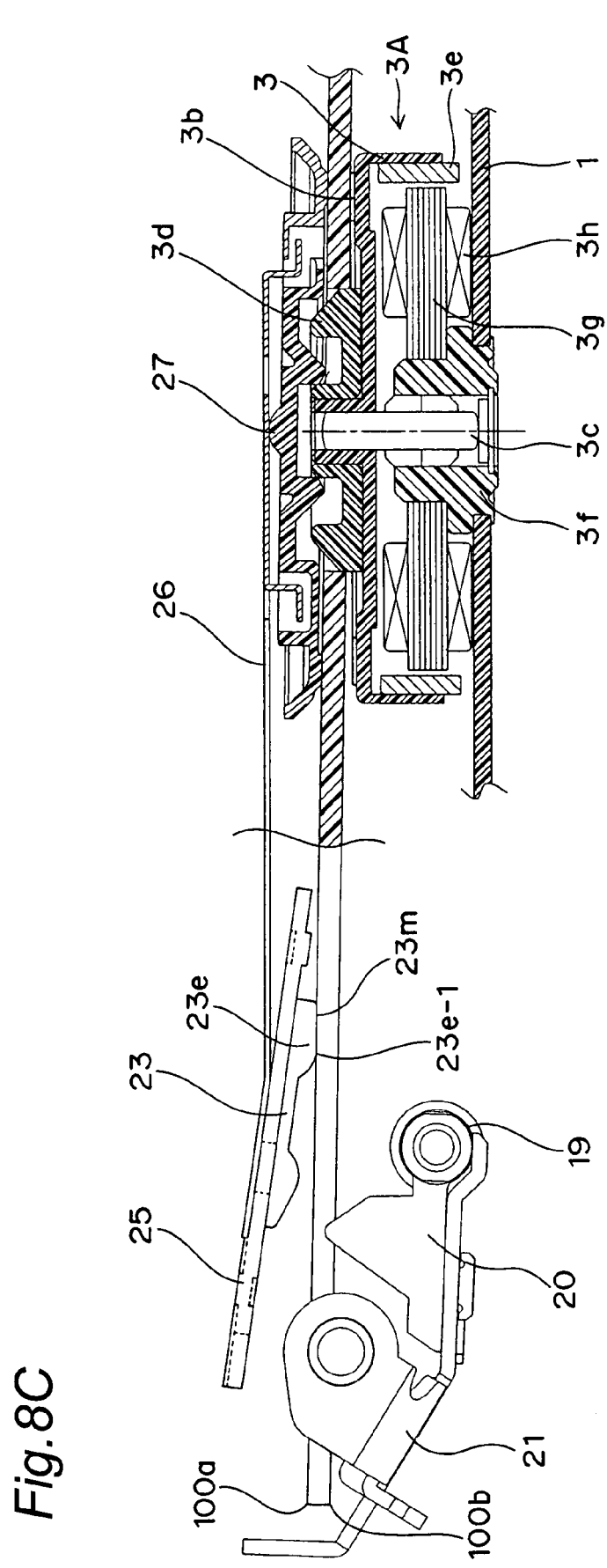
FIG. 8C is a partial side sectional view showing a state that oscillation is added to the large diametrical disk in the disk apparatus according to the first embodiment of the present invention during reproduction or recording of this large diametrical disk and the large diametrical disk is floating from the turn table.

Next, shapes of the projection guide portions 23e, 24e, 23f, and 24f on the downstream side in the disk insertion direction 42 of the disk guide 50 will be described more in detail with reference to FIG. 6B, FIG. 8A, FIG. 8B, and FIG. 8C. FIG. 8A is a partial side sectional view showing a state in the middle of loading operation of the large diametrical disk 100 of the disk apparatus according to the first embodiment of the present invention, FIG. 8B is a partial side sectional view showing a state that the large diametrical disk 100 is held on the surface of the turn table 3 approximately in parallel therewith, and FIG. 8C is a partial side sectional view showing a state that the large diametrical disk 100 is oscillated with receiving an impact or the like in reproduction or recording and the upstream side in the disk insertion direction 42 of the large diametrical disk 100 is floated from the turntable 3 as being clamped. Since the left disk guide 23 and the right disk guide 24 have the same constitutions and operational effects, only the left disk guide 23 will be described hereinafter.

In this case, as described above, the turn table 3 is structured by the rotor composing the spindle motor 3A. As shown in FIG. 8A, FIG. 8B, and FIG. 8C, the spindle motor 3A has a rotor, a rotational shaft 3c, a centering ring 3d, a magnet 3e, a bearing 3f, a core 3g, and a coil 3h. The rotor, namely, the turn table 3 is formed in a cup-shape opened downward. The turn table 3 has a turn table surface 3b on which the large diametrical disk 100 is mounted on its upper surface and has an upper tubular portion projecting upward on the upper surface center part. The rotational shaft 3c is formed in a rod-shape and the rotational shaft 3c integrally holds an inner circumferential side of the upper tubular portion of the turn table 3. The centering ring 3d is attached to the outer circumference of the tubular portion and the adjacent part of the upper tubular portion of the turntable surface 3b, and holding the center hole of the large diametrical disk 100, centering is carried out. The magnet 3e formed in a ring-shape is disposed on an inner circumferential surface of the lower tubular portion of the turn table 3. The bearing 3f formed in a tubular-shape is integrally disposed on the support board 1 and the bearing 3f rotatably holds the lower end portion of the rotational shaft 3c on its inner circumferential surface. The core 3g is fixed on an outer circumferential surface of the bearing 3f so as to be opposed to an inner circumferential surface of the magnet 3e. The coil 3h is wined around the core 3g. The spindle motor 3A is constituted so as to rotate the turn table 3 by rotating the magnet 3e opposed to the core 3g, which is integrally formed on the support board 1 via the bearing 3f, due to an electromagnetic force generated between the magnet 3e and the core 3g being applied with a current to the coil 3h.

The large diametrical disk 100 is rotated in reproduction or recording in the state as shown in FIG. 8B being held on the upper surface 3b of the turn table 3 by the clamper 27 approximately in parallel therewith. In this case, the projection guide portion 23e of the left disk guide 23 is positioned separated from the upper surface of the large diametrical disk 100. Then, during rotation of the large diametrical disk 100, a gyroscopic precession may act on the large diametrical disk 100 and a force to maintain the posture may act. In this case, some impact is applied to the disk apparatus, and when the disk apparatus is vertically oscillated, a disk suppressing force of the clamper 27 yields to this oscillation and the large diametrical disk 100 may be floated in a direction 46 departed from the turn table 3 (refer to FIG. 8B). Thereby, the floated large diametrical disk 100 may bring into contact with the projection guide portion 23e of the left disk guide 23 with remaining contacting the upper surface 3b of the turn table 3 with the suppressing force of the clamper 27 as shown in FIG. 8C. In other words, the projection guide portion 23e of the left disk guide 23 may bring into contact with the upper edge portion 10a of the large diametrical disk 100 in rotation. This position with which this edge portion 100a brings into contacts is a portion where the outer circumferential part of the large diametrical disk 100 shown in FIG. 3 crosses the projection guide portion 23e of the left disk guide 23.

Assuming that the projection guide portion 23e of the left disk guide 23 is formed so as to linearly contact the upper edge portion 100a of the large diametrical disk 100, due to the upper edge portion 100a of the large diametrical disk 100, the projection guide portion 23e of the left disk guide 23 is trimmed to generate a scratch and it could be that the large diametrical disk 100 cannot be discharged as getting stuck with this scratch. Therefore, on the projection guide portion 23e of the left disk guide 23 according to the first embodiment of the present invention, as shown in FIG. 8C, an inclined surface 23m is formed on the downstream side in the disk insertion direction 42 from the ridge line portion 23e-1 of the projection guide portion 23e so as to contact the upper surface of the floated large diametrical disk 100 in a wide area in order to prevent the scratch, particularly, of a ridge line portion 23e-1 of the projection guide portion 23e due to the upper edge portion 100a of the large diametrical disk 100. As shown in FIG. 8C, when the large diametrical disk 100 is remained contacting the upper surface 3b of the turn table 3 with the suppressing force of the clamper 27, namely, when the upstream side in the disk insertion direction 42 of the large diametrical disk 100 is lifted on the disk recording reproduction position to bring into contact with the projection guide portion 23e of the left disk guide 23, the inclined surface 23m can be positioned approximately in parallel with the large diametrical disk 100 and being opposed with the large diametrical disk 100. In addition, this inclined surface 23m is formed so that the downstream side in the disk insertion direction 42 in the vicinity of the upper edge portion 100a of the large diametrical disk 100 brings into contact with the large diametrical disk 100 slightly earlier than the upstream side thereof.

Accordingly, the projection guide portion 23e of the left disk guide 23 are surface-contacting the upper edge portion 100a of the large diametrical disk 100 on the inclined surface 23m, so that the trimmed portion is dispersed and the trimmed amount is made small. Thereby, it is possible to prevent a part of the projection guide portion 23e opposed to the upper edge portion 100a of the large diametrical disk 100 from being deeply scratched. As a result, it is possible to prevent a defect such that the large diametrical disk gets stuck with the scratch and the disk 100 cannot be discharged upon discharge of the large diametrical disk 100.

Further, since the downstream side of the inclined surface 23m in the disk insertion direction 42 is formed so as to bring into contact with the large diametrical disk 100 earlier than the upstream side thereof, when the large diametrical disk 100 is oscillated or receiving an impact, the downstream side of the inclined surface 23m in the disk insertion direction 42 may contact the large diametrical disk 100 earlier than the ridge line portion 23e-1 of the projection guide portion 23e. As a result, preventing to trim the ridge line portion 23e-1 of the projection guide portion 23e, a defect in discharge of the disk can be prevented. In addition, in place of providing the inclined surface 23m having a predetermined inclination, for example, by providing a convex portion on the downstream side of the inclined surface 23m in the disk insertion direction 42, the same effect can be also obtained.

In addition, providing the convex portion or the inclination or the like for bringing into contact with the large diametrical disk 100 on the downstream side of the clamp lever 25 in the disk insertion direction 42, the same effect as the inclined surface 23m can be obtained. However, since the clamp lever 25 is made of a metal plate, trimming and an abnormal sound of the large diametrical disk 100 is large when the large diametrical disk 100 contacts the inclined surface 23m, it is more preferable that the inclined surface 23m is provided on the left disk guide 23.

Further, since a relation between the small diametrical disk and the disk guide 50 is same as the above-described relation between the large diametrical disk 100 and the disk guide 50, the explanation thereof is herein omitted.

In addition, according to the first embodiment of the present invention, an example of the disk contact surface is formed by the projection guide portions 23c to 23f including the ridge line portions 23c-1 to 23f-1 and the inclined surface 23m.

The first embodiment of the present invention is constituted so as to have two inclined angles with the ridge line portions 23c-1 and 23d-1 having a large inclined angle and the ridge line portions 23e-1 and 23f-1 having a small inclined angle, however, the present invention is not limited to this. If the relative inclination between the left disk guide 23 and the large diametrical disk 100 is secured more than necessary angle due to sufficiently raising the height of the convex portion 23j, the disk apparatus of the present invention may be constituted so as to have an inclined angle. In other words, the ridge line portions 23c-1 and 23d-1 or the ridge line portions 23e-1 and 23f-1 may be located on the same line, respectively. In addition, on the contrary to this, the disk guide 50 may be constituted to have some inclined angles so as to gradually increase inclined angle within a range where the degree of accuracy of the parts can be managed. In other words, the disk guide 50 may be constituted to have a combination of linear ridge line portions which is nearer to an arc by dividing the projection guide portions 23c to 23f into multiple pieces.

Second Embodiment

Figure 9:
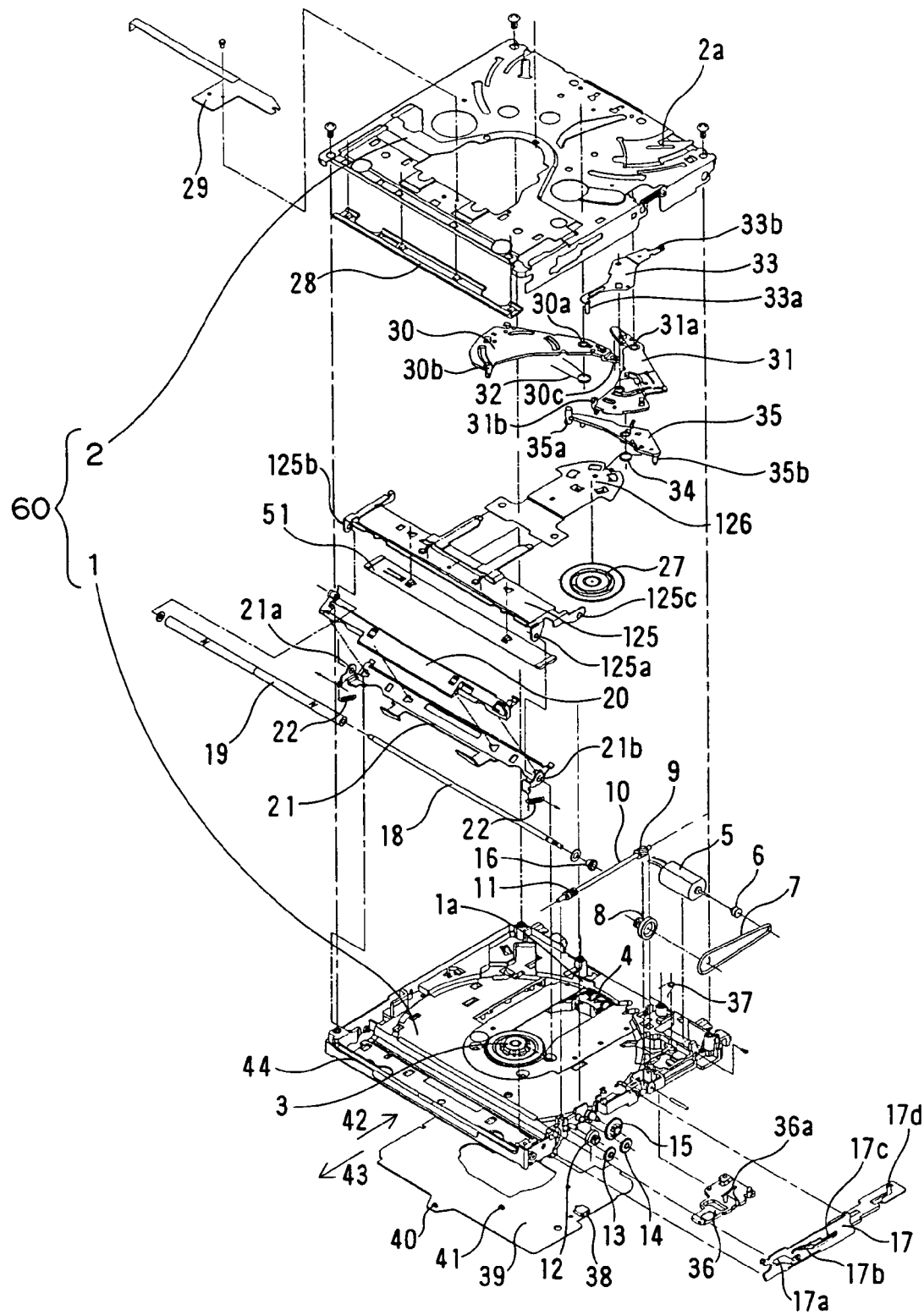
FIG. 9 is an exploded perspective view of a disk apparatus of a second embodiment according to the present invention.

A disk apparatus according to a second embodiment of the present invention will be described with reference to FIG. 9 and FIG. 10. FIG. 9 is an exploded perspective view of the disk apparatus according to the second embodiment of the present invention, and FIG. 10 is a front view showing a state that a disk guide of the disk apparatus according to the second embodiment of the present invention is attached to a clamp lever. The disk apparatus according to the second embodiment of the present invention is different from the disk apparatus according to the first embodiment of the present invention in points of having a clamp lever 125, a clamp plate 126, and a disk guide 51 in place of the clamp lever 25, the clamp plate 26, and the disk guide 50. Since the second embodiment of the present invention is the same as the first embodiment of the present invention in other points, the duplicated explanation of these points is herein omitted.

The clamp lever 125 is provided so as to be elongated in parallel with the support board 1 and in a direction bisecting the disk insertion direction 42, and the clamp lever 125 has a function of the disk guide fixing portion. The clamp lever 125 is rotatably supported by the support board 1 when the rotational shaft (not illustrated), which is disposed on the support board 1 and is the same as the roller lever 21, is fitted to bearing holes 125a and 125b formed on opposite ends thereof. The posture of the clamp lever 125 is controlled by engaging the pin 125c formed on one end portion thereof with the cam groove 17c in the cam rod 17. One end portion of the clamp plate 126 formed by an elastic blade spring is screwed on the upper center part of the clamp lever 125 so as to protrude to the downstream side in the disk insertion direction 42. Other end portion of the clamp plate 126 may rotatably support the disk-like clamper 27 by its lower surface. The clamp lever 125 and the clamp plate 126 may form an example of the clamp unit. If the cam rod 17 is moved in the disk insertion direction 42 or in the disk discharge direction 43 due to the rotational force of the rotational shaft of the motor 5, the clamp lever 125 which is engaged with the cam rod 17 in the cam groove 17c and the clamp plate 126 which is attached to the clamp lever 125 may be rotated centering around the portion where the bearing holes 125a and 125b of the clamp lever 125 are fitted to the rotational shaft (not illustrated). In this time, the clamper 27 is moved in a lower direction or in an upper direction.

The disk guide 51 is attached on the lower surface of the clamp lever 125, sandwiching the disk in corporation with the rubber roller 19 which is biased by the springs 22 in the upper direction and guiding the disk in the disk insertion direction 42. The disk guide 51 is made of a material which is softer than that of the disk so as not to scratch the disk. For example, if the material of the disk is polycarbonate, the disk guide 51 is made of a resin such as polyacetal or the like softer than polycarbonate.

The disk guide 51 is provided with a guide board 123 which is an example of the guide member formed in a long plate-shape having a length not less than a diameter of the large diametrical disk 100; convex portions 123b which are disposed in the vicinity of opposite end portions of the guide board 123; and a pair of hooks 123a symmetrically disposed for a center part 123c of the guide board 123, which is an example of the engagement portion. A surface on an attaching side of the disk guide 51 to the clamp lever 125 is formed so as to be flat.

The convex portion 123b is formed in a shape so as to be capable of maintaining an inclined angle between the disk guide 51 and the clamp lever 125 when the disk guide 51 is attached to the clamp lever 125. For example, the convex portion 123b is formed by a rod-like body or an aggregation of projections or the like. The height of the convex portion 123b is determined so as to be larger than a deformation due to warpage of the disk guide 51 (for example, about 0.2 mm). If the convex portion 123b is disposed too inside from the edge portion of the guide board 123, a contact area becomes too large when the guide board 123 brings into contact with the disk and this leads to the fact that the disk is easily scratched. On the other hand, if the convex portion 123b is disposed too near an edge portion of the guide board 123, the thickness thereof is made thin due to a sink generated upon molding and its height may be reduced. Therefore, it is preferable that the convex portion 123b is disposed slightly inside from the edge portion of the guide board 123. In addition, the guide board 123 may be integrally formed to the guide board 123. Further, the convex portion 123b may be attached to the clamp lever 125 or may be integrally formed to the clamp lever 125 other than the guide board 123. In addition, it is preferable that the hook 123a is disposed near the outside of the guide board 123 rather than the side of the center part 123c. Further, the hooks 123a are not limited to the constitution formed by a pair of members, and the hooks 123a may be formed in a shape capable of maintaining the inclined angle between the disk guide 51 and the clamp lever 125 when the disk guide 51 is attached to the clamp lever 125.

The disk apparatus according to the second embodiment of the present invention is constituted as described above.

According to the disk apparatus according to the second embodiment of the present invention, the convex portion 123b of the disk guide 51 brings into contact with the attaching surface 125d of the clamp lever 125 to be tense and a pair of hooks 125a is engaged to the clamp lever 125 so as to draw the vicinity of the center part 123c of the guide board 123 closer to the attaching surface 125d. Thereby, the disk guide 51 is attached to the clamp lever 125 with being deformed in an arc in a direction where the outside thereof is far from the attaching surface 125d. The disk guide 51 is made of a resin and is elastically deformed, so that the disk guide 51 presses the vicinity of the center part 123c of the disk guide 51 and a pair of the convex portions 123b on the attaching surface 125d by its elastic force. As a result, the disk guide 51 is attached to the clamp lever 125 without rattle. In addition, the vicinity of the center part 123c of the disk guide 51 is not floated, so that the center part 123c of the guide board 123 does not bring into contact with the disk. In addition, the height of the convex portion 123b is determined to be larger than the warpage accuracy of the disk guide 51, so that the disk guide 51 is elastically deformed on a constant basis to be fixed without rattle. In addition, the disk guide 51 is attached to the clamp lever 25 so that its outside is curved in a direction approaching the disk by a pair of convex portions 123b. In other words, the disk guide 51 is disposed so as to be inclined in the direction approaching the disk as it reaches the outside. Therefore, even if the warpage is caused on the disk due to the suppress force by means of the rubber roller 19, the disk guide 51 only contacts the edge portion of the disk. As a result, the disk guide 51 does not scratch the inside of the disk.

In addition, the projection guide portions 23c to 23f and 24c to 24f like the projection guide portions disposed on the disk guide 50 may be disposed on the disk contact surface side of the disk guide 51. In this case, the ridge line portions 23c-1 to 23f-1 and 24c-1 to 24f-1 with which the disk bring into contact are formed on the projection guide portions 23c to 23f and 24c to 24f, respectively, and as describe above, by forming the inclined surfaces 23m and 24m on the downstream side in the disk insertion direction 42 on the projection guide portions 23e and 24e on the downstream side in the disk insertion direction 42 from their ridge line portions 23e-1 and 24e-1, it is possible to obtain the same operational effects as the above-described first embodiment.

The embodiments according to the present invention have been as described above. However, the present invention is not limited to the above-described respective embodiments and various modifications are available.

It is to be noted that, by properly combining the arbitrary embodiments of the aforementioned various embodiments, the effects possessed by them can be produced.

The disk apparatus according to the present invention is available for a disk apparatus, which is provided with a slot-in loading mechanism for loading a recording medium formed in a disk-shape such as a CD and a DVD in the apparatus without using a tray.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. The disclosure of Japanese Patent Application No. 2006-106188 filed on Apr. 7, 2006 including specification, drawing and claims are incorporated herein by reference in its entirety.

The invention claimed is:

1. A disk apparatus comprising:
a chassis on which a disk insertion port for inserting a disk therein is formed on one side thereof;
a disk guide for guiding movement of the disk in a disk insertion direction, which is disposed in the chassis and bringing into contact with the disk to be inserted from the disk insertion port;
a disk conveying device for conveying the disk to a disk mounting preparation position being opposed to a disk recording reproduction position in the chassis in cooperation with the disk guide, which is disposed in the chassis;
a disk clamp device for mounting the disk conveyed to the disk mounting preparation position on the disk recording reproduction position, which is disposed in the chassis; and
a recording reproducing device for reproducing or recording and reproducing the disk mounted on the disk recording reproduction position, which is disposed in the chassis;
wherein, the disk guide comprising:
a platy guide member having a disk contact surface for bringing into contact with the disk in inserting, for guiding movement of the disk in the disk insertion direction with the disk contact surface, which is elongated in a intersecting direction for the disk insertion direction;
convex portions, which are disposed in a vicinity of respective ends on an opposite side surface of the disk contact surface of the guide member and in an elongated direction of the guide member; and
an engagement portion, which is disposed on the opposite side surface of the disk contact surface of the guide member and on a center part side in the elongated direction from the convex portion;
wherein, the disk guide is fixed to a platy disk guide fixing member which is disposed in the chassis to be elongated in the intersecting direction with the engagement portion engaged to the disk guide fixing member, and the disk guide being brought into contact with the convex portions on the platy disk guide member, the disk guide is inclined with an inclined angle increased in a direction far from the disk guide fixing member from a center part in the elongated direction of the guide member toward respective ends; and thereby the disk contact surface of the guide member brings into contact with only an outer circumferential portion of the disk in inserting.

2. The disk apparatus according to claim 1, wherein the guide member of the disk guide has a single platy member, and the engagement portion of the disk guide is disposed between the center part in the elongated direction of the guide member and the convex portion.

3. The disk apparatus according to claim 1, wherein the guide member of the disk guide has two platy members, which are disposed on opposite sides of the center part in the elongated direction of the guide member; and
the disk guide comprises second engagement portions on respective ends on the center part side in the elongated direction of the guide member in addition to the engagement portion; and
the disk guide is fixed on the disk guide fixing member by engaging the engagement portion and the second engagement portion to the disk guide fixing member.

4. The disk apparatus according to claim 1, wherein the disk guide fixing member comprises a convex part on a surface of an attaching side of the disk guide on the same position as the convex portion in place of the convex portion of the disk guide; and
the engagement portion of the disk guide is engaged and fixed on the surface on the attaching side of the disk guide in the disk guide fixing member, and the guide member is inclined in the direction far from the disk guide fixing member as the guide member reaches from the center part in the elongated direction of the guide member toward each end by bringing into contact with the convex part of the disk guide fixing member on the guide member of the disk guide, thereby the guide member brings into contact with only the outer circumferential portion of the disk in insertion.

5. The disk apparatus according to claims 1, wherein the disk clamp device comprises a clamper for suppressing the disk on the disk recording reproduction position in a turn table surface with the clamper for bringing into contact with the disk which is conveyed to the disk mounting preparation position,
a clamp unit for supporting the clamper, which includes the disk guide fixing member, the clamp unit being disposed to be elongated in the intersecting direction, and the clamp unit being rotatably fixed to the chassis centering around on a side of the disk insertion port, and
a driving mechanism for retreating the clamper to the disk mounting preparation position upon conveyance of the disk by means of the disk conveying device, enabling the disk contact surface of the guide member for bringing into contact with the disk to be inserted from the disk insertion port, rotating the clamp unit to move the clamper to the disk recording reproduction position, and retreating the disk from the disk contact surface of the guide member;
wherein the guide member of the disk guide has an inclined surface where the disk contact surface is inclined in a direction reaching the disk guide fixing member toward a downstream side in the disk insertion direction in a width direction in the vicinity of each end portion in the elongated direction; and
the inclined surface is far from a surface of the disk and is inclined on the surface of the disk with the disk held on the turn table surface approximately in parallel therewith when the clamper is moved to the disk recording reproduction position and the disk is mounted on the disk recording reproduction position; and when the disk is floated to bring into contact with the disk contact surface of the guide member and is inclined for the turn table surface, the inclined surface brings into contact with the surface of the disk approximately in parallel therewith, or the portion on the downstream side in the disk insertion direction of the inclined surface brings into contact with only the surface of the disk.

* * * * *